US009641076B2

(12) United States Patent
Kudo et al.

(10) Patent No.: US 9,641,076 B2
(45) Date of Patent: May 2, 2017

(54) SWITCHING REGULATORS

(71) Applicant: Samsung Electronics Co., Ltd., Suwon-Si, Gyeonggi-Do (KR)

(72) Inventors: Ryotaro Kudo, Seongnam-si (KR); Gwang-yol Noh, Anyang-si (KR); Hwa-yeal Yu, Bucheon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 48 days.

(21) Appl. No.: 14/589,332

(22) Filed: Jan. 5, 2015

(65) Prior Publication Data

US 2015/0194892 A1    Jul. 9, 2015

(30) Foreign Application Priority Data

Jan. 7, 2014  (KR) .................. 10-2014-0002081

(51) Int. Cl.
*H02M 3/158*  (2006.01)
*H02M 1/14*  (2006.01)

(52) U.S. Cl.
CPC ............. *H02M 3/158* (2013.01); *H02M 1/14* (2013.01); *H02M 3/1588* (2013.01); *H02M 2003/1586* (2013.01); *Y02B 70/1466* (2013.01)

(58) Field of Classification Search
CPC ............ H02M 1/14; H02M 3/158; G05F 1/46
See application file for complete search history.

(56) References Cited

U.S. PATENT DOCUMENTS

| | | | |
|---|---|---|---|
| 5,087,891 A | * | 2/1992 | Cytera .................... G05F 3/262 |
| | | | 323/315 |
| 5,499,178 A | | 3/1996 | Mohan |
| 6,362,607 B1 | | 3/2002 | Wickersham et al. |
| 6,583,610 B2 | | 6/2003 | Groom et al. |
| 6,806,689 B2 | | 10/2004 | Schuellein et al. |
| 7,443,148 B2 | | 10/2008 | Weng |
| 7,482,791 B2 | | 1/2009 | Stoichita et al. |
| 7,482,793 B2 | | 1/2009 | Stoichita |
| 7,932,709 B1 | | 4/2011 | Ling |

(Continued)

OTHER PUBLICATIONS

N. Zhang, "D-CAP™ Mode With All-Ceramic Output Capacitor Application", Application Report, Feb. 2011, SLVA453, 9pgs, Texas Instruments Incorporated.

*Primary Examiner* — Jessica Han
*Assistant Examiner* — Bart Iliya
(74) *Attorney, Agent, or Firm* — Harness, Dickey & Pierce, PLC

(57) ABSTRACT

A switching regulator switches a current from input direct current (DC) power to generate target DC power. The switching regulator includes: a direct current (DC)-DC converter and a ripple injection circuit. The DC-DC converter is configured to: generate an output voltage at an output terminal based on an input voltage applied to an input terminal, and according to a switching cycle that selectively forms a voltage-down current path or a voltage-up current path based on a comparison between a reference voltage and a voltage sensed at a feedback node; and apply a feedback current from the output terminal to the feedback node. The ripple injection circuit is configured to: generate a pulse current synchronized with the switching cycle; and apply the pulse current to the feedback node.

5 Claims, 14 Drawing Sheets

(56) References Cited

U.S. PATENT DOCUMENTS

| | | | | |
|---|---|---|---|---|
| 2002/0185994 A1* | 12/2002 | Kanouda | ............... | H02M 3/158 323/282 |
| 2004/0189354 A1 | 9/2004 | Yanagihara | ......... | H04L 25/0272 327/112 |
| 2004/0232900 A1* | 11/2004 | Huang | .................. | H02M 3/158 323/282 |
| 2011/0241640 A1* | 10/2011 | Qiu | .................... | H02M 3/1584 323/283 |
| 2012/0274301 A1* | 11/2012 | Nakashima | ......... | H02M 3/1588 323/284 |
| 2012/0306465 A1* | 12/2012 | Suga | .................... | H02M 3/156 323/282 |
| 2014/0103896 A1* | 4/2014 | Lee | ...................... | H02M 3/158 323/282 |
| 2014/0347028 A1* | 11/2014 | Jayaraj | ............... | H02M 3/1588 323/282 |
| 2015/0067358 A1* | 3/2015 | Philbrick | ............. | H02M 3/158 713/300 |

\* cited by examiner

SWITCHING REGULATORS

CROSS-REFERENCE TO RELATED APPLICATION(S)

This application claims priority under 35 U.S.C. §119 to Korean Patent Application No. 10-2014-0002081, filed on Jan. 7, 2014, in the Korean Intellectual Property Office, the disclosure of which is incorporated herein in its entirety by reference.

BACKGROUND

Field

One or more example embodiments of inventive concepts relate to power supply devices, and more particularly, to switching regulators configured to generate target direct current (DC) power by switching a current supplied from a DC power supply.

Description of Conventional Art

A switching regulator is a device that converts power input from an external source into DC power for a system using a switching element. An example of a switching regulator is a DC-DC converter that increases or decreases input DC power. A conventional switching regulator performs a switching operation using a ripple voltage.

SUMMARY

Some example embodiments of inventive concepts provide switching regulators for improving system stability using a ripple injection circuit.

Some example embodiments of inventive concepts also provide switching regulators that reduce a ripple voltage via multi-phase switching control.

An example embodiment provides a switching regulator including a direct current (DC)-DC converter and a ripple injection circuit. The DC-DC converter is configured to: generate an output voltage at an output terminal based on an input voltage applied to an input terminal, and according to a switching cycle that selectively forms a voltage-down current path or a voltage-up current path based on a comparison between a reference voltage and a voltage sensed at a feedback node; and apply a feedback current from the output terminal to the feedback node. The ripple injection circuit is configured to: generate a pulse current synchronized with the switching cycle; and apply the pulse current to the feedback node.

The switching regulator may further include an offset compensation circuit configured to, based on the pulse current, form a path through which an offset compensation current flows from the feedback node to a ground node to reduce an offset voltage. The offset compensation circuit may include: a current source circuit; and first and second transistors connected to the current source circuit. A first terminal of the first transistor is connected to an output node of the current source circuit, a second terminal of the first transistor is connected to the ground node, and a gate terminal of the first transistor is connected to the first terminal of the first transistor. A first terminal of the second transistor is connected to the feedback node, a second terminal of the second transistor is connected to the ground node, and a gate terminal of the second transistor is connected to the output node of the current source circuit.

At least one of the DC-DC converter, the ripple injection circuit, and the offset compensation circuit may be integrated in a single chip.

The ripple injection circuit may include: a current source circuit; a logic circuit configured to generate a pulse signal synchronized with the switching cycle; and a switching circuit connected between an output node of the current source circuit and the feedback node, the switching circuit being configured to perform a switching operation based on the pulse signal.

The current source circuit may include: a transistor having a first terminal connected to a supply voltage, a second terminal connected to the output node of the current source circuit, and a gate terminal connected to a bias voltage.

The switching circuit may include: a transistor having a first terminal connected to the output node of the current source circuit, a second terminal connected to the feedback node. The pulse signal may be applied to a gate terminal of the transistor.

The DC-DC converter may include: a feedback circuit configured to generate the feedback current based on the output voltage at the output terminal, and to apply the feedback current to the feedback node; a comparator configured to generate a comparison signal based on the comparison between the reference voltage and the voltage sensed at the feedback node; a control circuit configured to generate a switching control signal based on the comparison signal; and a switching driving circuit configured to perform a switching operation to form one of a first current path and a second current path; wherein the first current path is a current path through which the output voltage at the output terminal is increased, the second current path being a current path through which the output voltage at the output terminal is decreased, and the switching operation is based on the switching control signal generated by the control circuit.

The feedback circuit may include: a first resistor connected between the output terminal and the feedback node; a second resistor connected between the feedback node and a ground node; and a first capacitor connected in parallel with the first resistor between the output terminal and the feedback node.

The switching control signal may have a fixed pulse width and a variable pulse generation interval; the switching driving circuit may include and inductor; and a first time period during which a current flows from the input terminal to the output terminal via the inductor or a second time period during which a current flows from the output terminal to a ground node via the inductor may be determined based on the fixed pulse width of the switching control signal.

The switching control signal may have a variable pulse width, the variable pulse width varying based on one of (i) a ratio between the input voltage and the output voltage, and (ii) a ratio between a current corresponding to the input voltage and a current corresponding to the output voltage.

The switching driving circuit may include: a driver circuit configured to output a voltage-up switching signal and a voltage-down switching signal based on the switching control signal; a switching circuit configured to adjust a voltage at the output terminal by switching between current paths based on the voltage-up switching signal and the voltage-down switching signal; an inductor arranged in the current paths; and a capacitor connected between the output terminal and a ground node.

At least one other example embodiment provides a switching regulator including: a feedback circuit configured to generate a feedback voltage based on a voltage at an output terminal, and to apply the feedback voltage to a feedback node; a comparator configured to generate a comparison signal based on a comparison between the feedback voltage and a reference voltage; a control circuit configured to sequentially generate a plurality of switching control signals based on phase changes of the comparison signal; a plurality of drivers, each of the plurality of drivers being configured to output a voltage-up switching signal and a voltage-down switching signal according to a corresponding one of the plurality of switching control signals; and a plurality of switching circuits configured to increase or decrease a voltage at the output terminal by switching between current paths based on the voltage-up switching signals and the voltage-down switching signals output by the plurality of drivers; wherein inductors are arranged in the current paths, and a capacitor is connected between the output terminal and a ground node.

The plurality of switching control signals may have a fixed pulse width and a variable pulse generation interval. A pulse width of the voltage-up switching signal or a pulse width of the voltage-down switching signal may be determined based on the fixed pulse width of the corresponding one of the plurality of switching control signals.

The switching regulator may further include: a ripple injection circuit configured to generate a pulse current synchronized with a phase change of the comparison signal, and to apply the pulse current to the feedback node; and an offset compensation circuit configured to, based on the pulse current, form a path through which an offset compensation current flows from the feedback node to a ground node to reduce an offset voltage.

At least one other example embodiment provides a switching regulator including: a direct current (DC)-DC converter configured to generate a comparison signal based on a comparison between a reference voltage and a feedback voltage sensed at a feedback node, and to generate an output voltage at an output terminal based on the comparison signal, the feedback voltage sensed at the feedback node resulting from a pulse current and a feedback current output from the output terminal to the feedback node; and a ripple injection circuit configured to generate the pulse current based on the comparison signal.

The DC-DC converter may be further configured to generate the output voltage at the output terminal by selecting one of a voltage-down current path and a voltage-up current path based on the comparison signal. The ripple injection circuit may be further configured to generate the pulse current in synchronization with the selection of the voltage-down current path or the voltage-up current path.

The switching regulator may further include: an offset compensation circuit configured to reduce an offset voltage by forming a path through which an offset compensation current flows from the feedback node to a ground node.

The ripple injection circuit may include: a logic circuit configured to generate a pulse signal in response to a transition of the comparison signal from a first logic state to a second logic state; and a switching circuit configured to generate the pulse current based on the pulse signal.

BRIEF DESCRIPTION OF THE DRAWINGS

Example embodiments of inventive concepts will be more clearly understood from the following detailed description taken in conjunction with the accompanying drawings in which.

DETAILED DESCRIPTION

Figure 1:
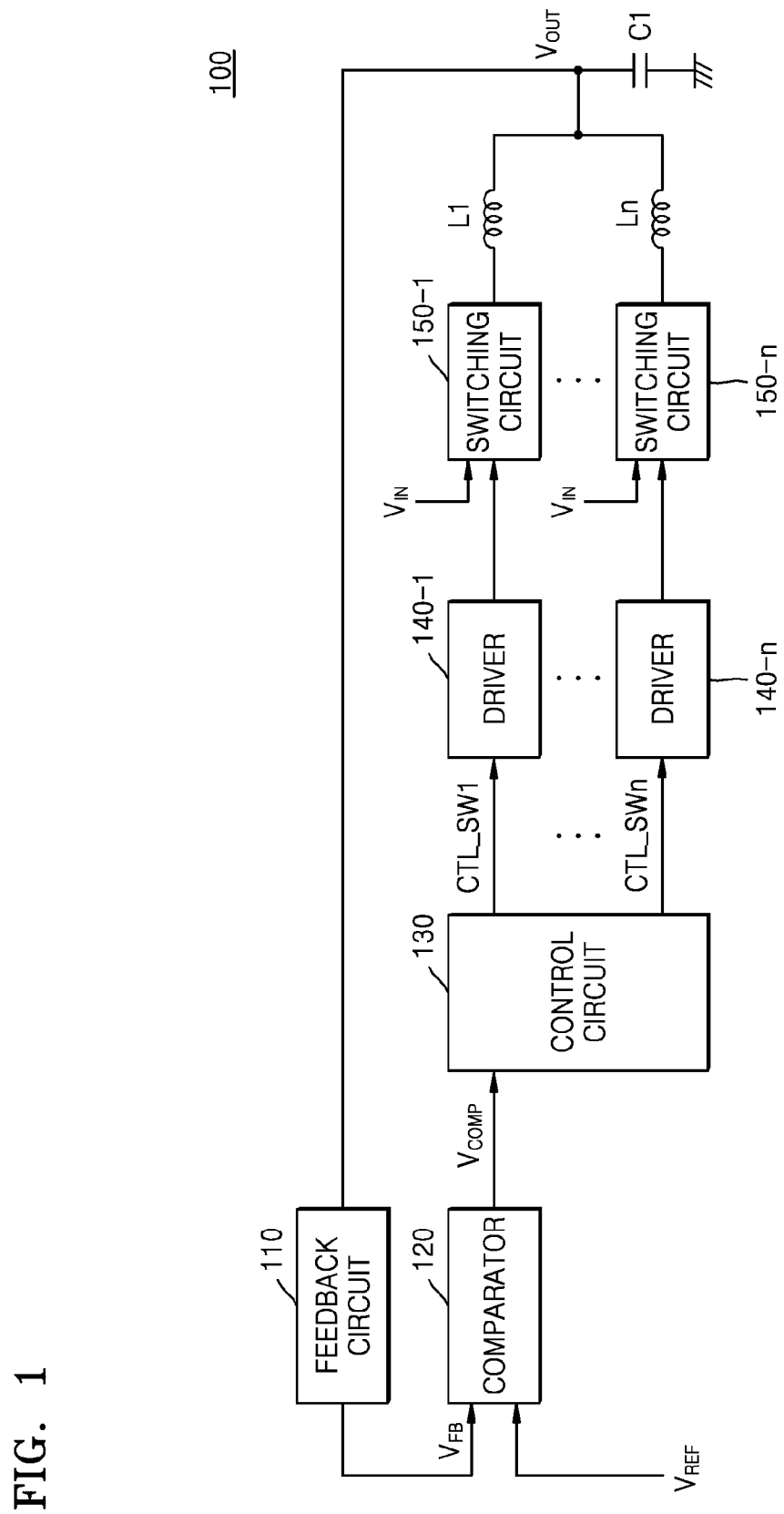
FIG. 1 is a structural diagram illustrating a switching regulator according to an example embodiment of inventive concepts.

Hereinafter, example embodiments of inventive concepts will be described in detail with reference to the accompanying drawings. Example embodiments of inventive concepts are provided so that this disclosure will be thorough and complete, and will fully convey the concept of inventive concepts to one of ordinary skill in the art. Since inventive concepts may have diverse modified embodiments, example embodiments are illustrated in the drawings and are described in the detailed description of inventive concepts. However, this does not limit inventive concepts within specific embodiments and it should be understood that inventive concepts cover all the modifications, equivalents, and replacements within the idea and technical scope of inventive concepts. Like reference numerals refer to like elements throughout. In the drawings, the dimensions and size of each structure are exaggerated, reduced, or schematically illustrated for convenience in description and clarity.

The terms used in this application, only certain embodiments have been used to describe, is not intended to limit the present embodiments. In the following description, the technical terms are used only for explain a specific exemplary embodiment while not limiting the present embodiments. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As discussed herein, example embodiments and/or one or more components thereof may be hardware, firmware, hardware executing software or any combination thereof. When example embodiments and/or one or more components thereof are hardware, such hardware may include one or more Central Processing circuits (CPUs), system-on-chips (SOCs), digital signal processors (DSPs), application-specific-integrated-circuits (ASICs), field programmable gate arrays (FPGAs) computers or the like configured as special purpose machines to perform the functions of example embodiments and/or one or more components thereof. CPUs, SOCs, DSPs, ASICs and FPGAs may sometimes generally be referred to as processors and/or microprocessors.

Expressions such as "at least one of," when preceding a list of elements, modify the entire list of elements and do not modify the individual elements of the list.

FIG. 1 is a structural diagram illustrating a switching regulator 100 according to an example embodiment of inventive concepts.

The switching regulator 100 illustrated in FIG. 1 is a multi-phase type switching regulator. As illustrated in FIG. 1, the switching regulator 100 includes: a feedback circuit 110; a comparator 120; a control circuit 130; a plurality of drivers 140-1 through 140-n; a plurality of switching circuits 150-1 through 150-n; a plurality of inductors L1 through Ln; and a capacitor C1. Here, n is a natural number greater than or equal to 2.

The feedback circuit 110 generates a feedback voltage $V_{FB}$ based on a voltage $V_{OUT}$ of an output terminal, and applies the feedback voltage $V_{FB}$ to the comparator 120. For example, the feedback voltage $V_{FB}$ is sensed based on a feedback current that is generated based on the voltage $V_{OUT}$ of the output terminal.

The comparator 120 generates a comparison voltage $V_{COMP}$ based on a difference between the feedback voltage $V_{FB}$ and the reference voltage $V_{REF}$. For example, when feedback voltage $V_{FB}$ is greater than the reference voltage $V_{REF}$, the comparator 120 may generate a signal having a first phase. Otherwise, the comparator 120 may generate a signal having a second phase, which is the inverse of the first phase. A signal having the first phase may be a signal indicating a first logic state, and a signal having the second phase may be a signal indicating a second logic state.

The control circuit 130 sequentially generates a switching control signal CTL_SWi (i=1 through n) with respect to each of a plurality of phases, based on a phase change of the comparison signal $V_{COMP}$, and outputs the switching control signal CTL_SWi to a driver 140-i with respect to a corresponding phase. The switching control signal CTRL_SWi is generated in the form of a one-shot pulse signal.

For example, the control circuit 130 may generate a switching control signal CTL_SWi having a fixed pulse width and a variable pulse generation interval. The switching control signal CTL_SWi may be referred to as a constant-on-time (COT) pulse signal.

Alternatively, the control circuit 130 may generate a switching control signal having a variable pulse width based on a ratio between an input voltage $V_{IN}$ and an output voltage $V_{OUT}$ or a ratio between a current according to the input voltage $V_{IN}$ and a current according to the output voltage $V_{OUT}$. In more detail, the control circuit 130 may generate a switching control signal having a pulse width that is proportional to $V_{IN}/V_{OUT}$.

For example, for a three-phase type switching regulator where n=3, the control circuit 130 sequentially generates switching control signals CTL_SW1, CTL_SW2, CTL_SW3, CTL_SW1, CTL_SW2, . . . each time a comparison signal $V_{COMP}$ changes from a first logic state to a second logic state. The control circuit 130 outputs the switching control signal CTL_SW1 to a driver 140-1 with respect to a first phase, and the switching control signal CTL_SWn to a driver 140-n with respect to an n-th phase. Each of the plurality of drivers 140-1 through 140-n generates a voltage-up switching signal and a voltage-down switching signal using a switching control signal CTRL_SWi received from the control circuit 130. For example, a voltage-up switching signal may be generated whereby a length of a section thereof, in which a voltage-up switching circuit is turned on, is determined according to a pulse width of the switching control signal CTL_SWi. Alternatively, a voltage-down switching signal may be generated whereby a length of a section thereof, in which a voltage-down switching circuit is turned on, is determined according to a pulse width of the switching control signal CTL_SWi.

The plurality of switching circuits 150-1 through 150-n are each connected to a driver 140-i corresponding to each phase. The plurality of switching circuits 150-1 through 150-n switch current paths corresponding to first through n-th phases, respectively, so as to increase or decrease a voltage of an output terminal of the switching regulator 100 based on a voltage-up switching signal or a voltage-down switching signal received from connected drivers 140-1 through 140-i.

The inductors L1 through Ln are respectively disposed on current paths corresponding to each phase. A capacitor C1 is connected between the output terminal of the switching regulator 100 and a ground node.

For example, when a voltage-up current path is formed according to a voltage-up switching signal corresponding to a first phase, a current flows from an input terminal of the switching regulator 100, to which an input voltage $V_{IN}$ is applied, to an output terminal of the switching regulator 100 via the inductor L1. Accordingly, the output voltage $V_{OUT}$ is increased.

Next, when a voltage-down current path is formed according to a voltage-down switching signal corresponding to the first phase, a current flows from an output terminal of the switching regulator 100, where an output voltage $V_{OUT}$ is sensed, to a ground node via the inductor L1. Accordingly, the output voltage $V_{OUT}$ is reduced.

Accordingly, when a feedback voltage $V_{FB}$ is smaller than a reference voltage $V_{REF}$, a voltage-up current path according to a switching operation of the switching circuit 150-1 corresponding to the first phase is formed during a one-shot pulse ON time interval (section) of the switching control signal CTL_SW1, and thus the output voltage $V_{OUT}$ increases. After the one-shot pulse ON time interval of the switching control signal CTL_SW1 has passed, a voltage-down current path according to the switching operation of the switching circuit 150-1 with respect to the first phase is formed and the output voltage $V_{OUT}$ is decreased. The voltage-down current path is maintained until a one-shot pulse section of the switching control signal CTL_SW2 corresponding to a next phase is generated.

In the same manner as the switching operation on the first phase as described above, a current path switching operation on each of second through n-th phases is performed sequentially.

For example, the switching regulator 100 may be configured (or alternatively designed) such that, from among circuit elements of the switching regulator 100 illustrated in FIG. 1, a feedback circuit 110, a comparator 120, a control circuit 130, a plurality of drivers 140-1 through 140-n, and a plurality of switching circuits 150-1 through 150-n are integrated in a single semiconductor chip.

Figure 2:
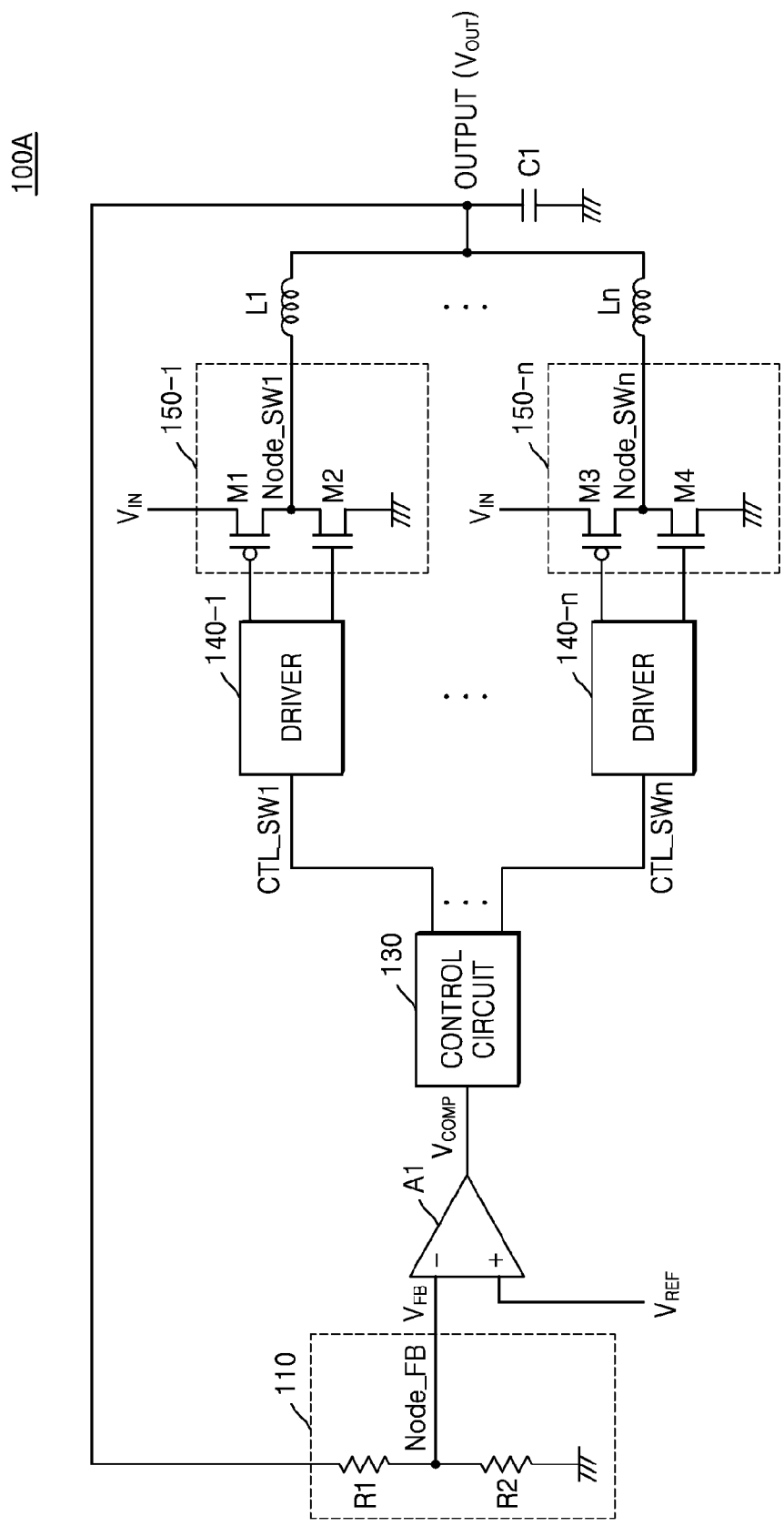
FIG. 2 is a detailed circuit structural diagram illustrating the switching regulator of FIG. 1 according to an example embodiment of inventive concepts.

FIG. 2 is a detailed circuit diagram illustrating a switching regulator 100A according to another example embodiment of inventive concepts. The switching regulator 100A in FIG. 2 is a modified example of the switching regulator 100 in FIG. 1.

Referring to FIG. 2, the feedback circuit 110 has a circuit structure in which a resistor R1 is connected between an output terminal OUTPUT and a feedback node Node_FB, and in which a resistor R2 is connected between the feedback node Node_FB and a ground node.

The comparator 120 may be an operational amplifier (OP amp) A1. For example, a reference voltage $V_{REF}$ may be applied to a positive input terminal (+) of the OP amp A1, and a feedback voltage $V_{FB}$ sensed at the feedback node Node_FB is applied to a negative input terminal (−). When the feedback voltage $V_{FB}$ is greater than the reference voltage $V_{REF}$, a comparison signal $V_{COMP}$ output from the OP amp A1 is at a voltage level LOW indicating a logic state of '0', and when the feedback voltage $V_{FB}$ is smaller than the reference voltage $V_{REF}$, the comparison signal $V_{COMP}$ is at a voltage level HIGH indicating a logic state of '1.'

Alternatively, a reference voltage $V_{REF}$ may be applied to the negative input terminal (−) of the OP amp A1, and a feedback voltage $V_{FB}$ sensed at the feedback node Node_FB may be applied to the positive input terminal (+).

The control circuit 130 and the plurality of drivers 140-1 through 140-n have been described above with reference to FIG. 1, and thus repeated description thereof will be omitted.

Each of the plurality of switching circuits 150-1 through 150-n may include a combination of a p-type metal oxide semiconductor (PMOS) transistor and an n-type metal oxide semiconductor (NMOS) transistor.

For example, the switching circuit 150-1 may be formed of a combination of a PMOS transistor M1 and an NMOS transistor M2. A first terminal of the PMOS transistor M1 is connected to an input terminal of the switching regulator 100A to which an input voltage $V_{IN}$ is applied, and a second terminal of the PMOS transistor M1 is connected to an output node Node_SW1, and a voltage-up switching signal output from a first driver 140-1 is applied to a gate terminal of the PMOS transistor M1. Also, a first terminal of the NMOS transistor M2 is connected to a ground node, a second terminal of the NMOS transistor M2 is connected to the output node Node_SW1, and a voltage-up switching signal output from the first driver 140-1 is applied to a gate terminal of the NMOS transistor M2.

Accordingly, when the feedback voltage $V_{FB}$ is smaller than the reference voltage $V_{REF}$, the PMOS transistor M1 is turned on according to a voltage-up switching signal during a one-shot pulse ON time section of the switching control signal CTL_SW1. Also, the NMOS transistor M2 is turned off. Accordingly, during the one-shot pulse ON time section of the switching control signal CTL_SW1, a current due to an input voltage $V_{IN}$ flows to the output terminal OUTPUT through an inductor L1, and thus the output voltage $V_{OUT}$ increases. After the one-shot pulse ON time section of the switching control signal CTL_SW1 has passed, the NMOS transistor M2 is turned on according to a voltage-down switching signal. Also, the PMOS transistor M1 is turned off. Accordingly, the output voltage $V_{OUT}$ charged in the capacitor C1 is discharged to the ground node through the inductor L1 and the NMOS transistor M2, which is turned on, thereby decreasing the output voltage $V_{OUT}$. The transistor M2 is turned on until a one-shot pulse of the switching control signal CTL_SWi with respect to a next phase is generated.

The rest of the switching circuits 150-2 through 150-n may have the same or substantially the same circuit structure as that of the first switching circuit 150-1. That is, for example, the switching circuit 150-n may include a combination of a PMOS transistor M3 and an NMOS transistor M4. A first terminal of the PMOS transistor M3 is connected to an input terminal of the switching regulator 100A, a second terminal of the PMOS transistor M3 is connected to an output node Node_SWn, and a voltage-up switching signal output from an n-th driver 140-n is applied to a gate terminal of the PMOS transistor M3. Also, a first terminal of the NMOS transistor M4 is connected to a ground node, and a second terminal of the NMOS transistor M4 is connected to the output node Node_SWn, and a voltage-down switching signal output from the driver 140-n is applied to a gate terminal of the NMOS transistor M4.

For example, the switching regulator 100A illustrated in FIG. 2 may be configured (or alternatively designed) such that circuits, except the inductors L1 through Ln and the capacitor C1, are integrated in a single semiconductor chip.

Figure 3:
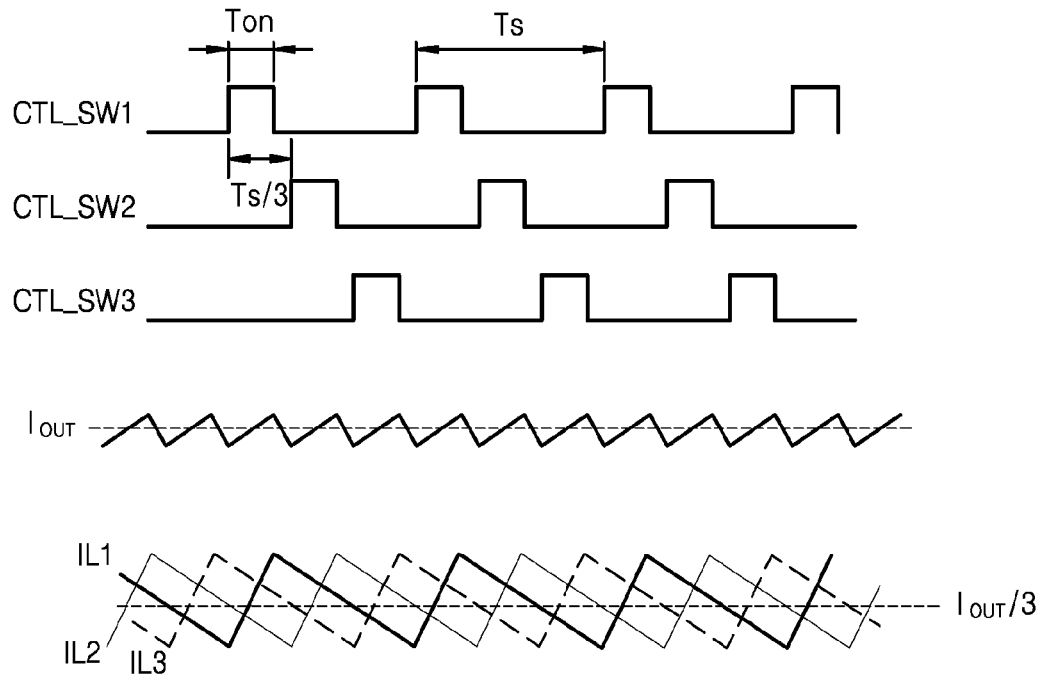
FIG. 3 illustrates waveform diagrams illustrating major signals of a three-phase type switching regulator according to an example embodiment of inventive concepts.

For example, when assuming a three-phase type switching regulator where n=3, waveforms of major signals generated in the switching regulator 100A are illustrated in FIG. 3.

FIG. 3 illustrates an output current $I_{OUT}$ flowing through an output terminal, and currents IL1 through IL3 respectively flowing through inductors on paths corresponding to first through third phases via switching control signals CTL_SW1 through CTL_SW3 corresponding to the first through third phases generated in the control circuit 130. The output current $I_{OUT}$ flowing through the output terminal is a sum of the currents IL1 through IL3 respectively flowing through inductors corresponding to each of the first through third phases.

For example, a pulse width Ton of the switching control signals CTL_SW1 through CTL_SW3 may be fixed, and a pulse generation interval Ts may be varied for regulation of an output voltage. In a three-phase type switching regulator, pulses of the switching control signals CTL_SW1 through CTL_SW3 generated therefrom are offset from one another by a time period of about Ts/3.

A ripple voltage occurring at the output voltage $V_{OUT}$ is generated due to a ripple current of the output current $I_{OUT}$. Also, a ripple voltage of the feedback voltage $V_{FB}$ sensed at the feedback node Node_FB of the feedback circuit 110 is generated due to a ripple current that is fed back from the output terminal.

The multi-phase type switching regulator as described above may reduce amplitude of the ripple voltage occurring at the output terminal, compared to a single-phase type switching regulator. For example, a ripple voltage occurring at an output terminal may also be reduced in a multi-phase type switching regulator to which a constant-on-time (COT) method is applied.

However, in a multi-phase type switching regulator to which a COT method is applied, if a ripple voltage of a feedback voltage sensed at a feedback node Node_FB is too small, a switching operation of the multi-phase type switching regulator may be unstable.

In order to improve the instability of the switching operation, a switching regulator is provided according to an example embodiment of inventive concepts, whereby a switching operation may be more stably performed even when a relatively small ripple voltage sensed at the feedback node Node_FB is generated due to a ripple voltage occurring at an output terminal.

At least one other example embodiment of inventive concepts provides a method of artificially generating a pulse current in a switching regulator in order to increase stability and applying the pulse current to a feedback node Node_FB to generate a ripple voltage.

Figure 4:
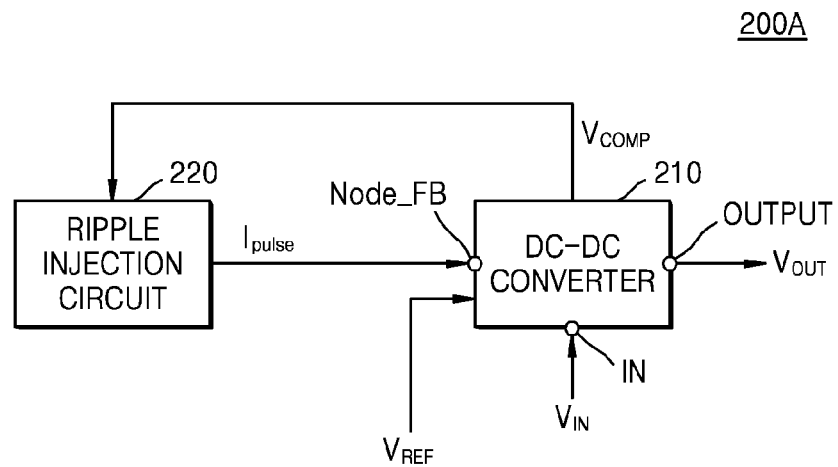
FIG. 4 is a structural diagram illustrating a switching regulator according to another example embodiment of inventive concepts.

FIG. 4 is a structural diagram illustrating a switching regulator 200A according to another example embodiment of inventive concepts.

As illustrated in FIG. 4, the switching regulator 200A includes a DC-DC converter 210 and a ripple injection circuit 220.

The DC-DC converter 210 generates an output voltage $V_{OUT}$, which is output to an output terminal OUTPUT, based on an input voltage $V_{IN}$ applied to an input terminal IN. The DC-DC converter 210 generates the output voltage $V_{OUT}$ according to a switching cycle, according to which a voltage-down current path or a voltage-up current path is selectively formed, based on a result of comparing a voltage sensed at the feedback node Node_FB and a reference voltage $V_{REF}$, and applies a feedback current $I_{pulse}$ generated in the ripple injection circuit 220 according to a comparison signal VCOMP to the feedback node Node_FB. The DC-DC converter 210 may be a single phase DC-DC converter or a multi-phase DC-DC converter. For example, the multi-phase DC-DC converter may be the switching regulator 100 illustrated in FIG. 1 or the switching regulator 100A illustrated in FIG. 2.

The DC-DC converter 210 transmits a comparison signal $V_{COMP}$, which is generated based on a difference between a voltage sensed at the feedback node Node_FB and the reference voltage $V_{REF}$, to the ripple injection circuit 220.

The ripple injection circuit 220 generates a pulse current that is synchronized with a switching cycle according to which a voltage-down current path or a voltage-up current path of the DC-DC converter 210 is selectively formed based on the comparison signal $V_{COMP}$ received from the DC-DC converter 210, and applies the pulse current to the feedback node Node_FB. A ripple voltage is generated at the feedback node Node_FB due to the pulse current applied to the feedback node Node_FB via the ripple injection circuit 220.

As described above, due to the ripple voltage that is artificially generated at the feedback node Node_FB via the ripple injection circuit 220, the DC-DC converter 210 may operate more stably even when a relatively small ripple voltage is fed back from the output terminal to the feedback node Node_FB.

For example, the switching regulator 200A may be configured (or alternatively designed) such that some of circuit elements of the DC-DC converter 210 from among circuit elements of the switching regulator 200A illustrated in FIG. 4 and the ripple injection circuit 220 are integrated in a single semiconductor chip.

Figure 5:
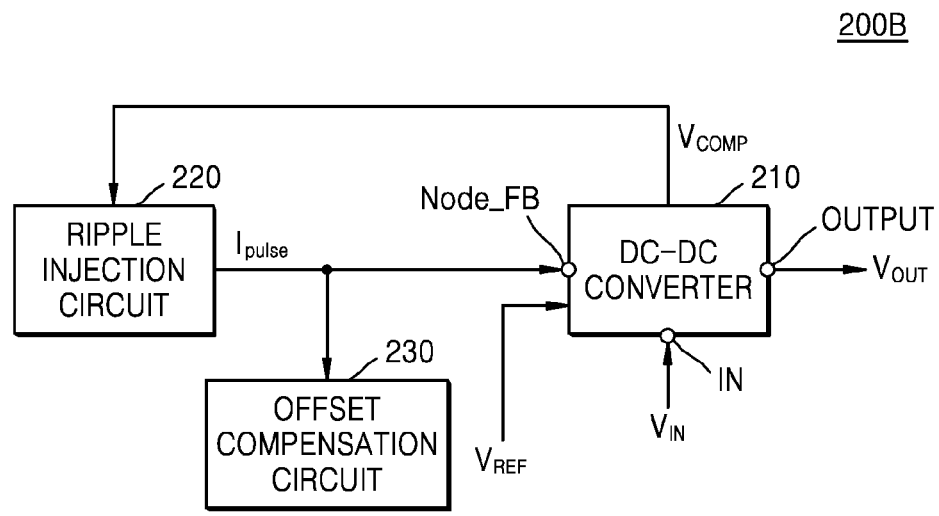
FIG. 5 is a structural diagram illustrating a switching regulator according to another example embodiment of inventive concepts.

FIG. 5 is a structural diagram illustrating a switching regulator 200B according to another example embodiment of inventive concepts.

As illustrated in FIG. 5, the switching regulator 200B includes: the DC-DC converter 210; the ripple injection circuit 220; and an offset compensation circuit 230.

The DC-DC converter 210 and the ripple injection circuit 220 are described above with reference to FIG. 4, and thus, repeated description thereof will be omitted.

The offset compensation circuit 230 includes a circuit whereby a path is formed, through which an offset compensation current flows from the feedback node Node_FB to a ground node, in order to reduce an offset voltage generated due to a pulse current applied to the feedback node Node_FB through the ripple injection circuit 220. The amount of current whereby an offset voltage generated due to a pulse current applied to the feedback node Node_FB is offset may be determined as the amount of offset compensation current. An example embodiment of a method of determining an amount of the offset compensation current will be described in more detail below.

For example, the switching regulator 200B may be configured (or alternatively designed) such that some of circuit elements of the DC-DC converter 210 from among circuit elements of the switching regulator 200B illustrated in FIG. 5 and the ripple injection circuit 220 are integrated in a single semiconductor chip.

Figure 6:
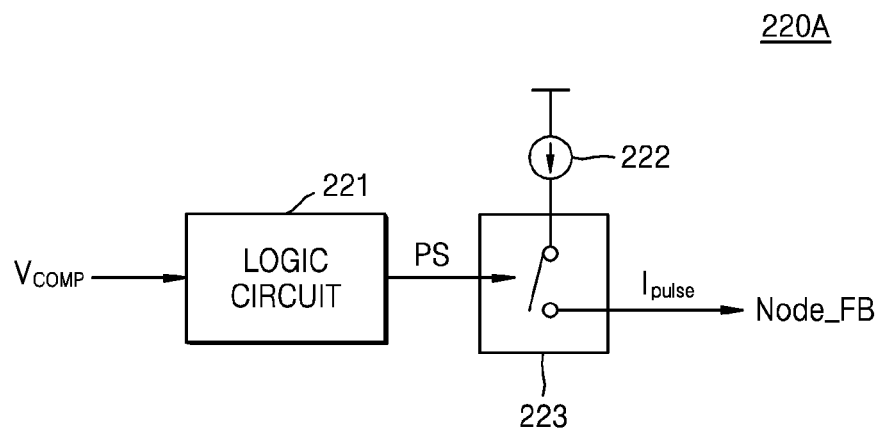
FIG. 6 illustrates a detailed structure of a ripple injection circuit of FIGS. 4 and 5 according to an example embodiment of inventive concepts.

FIG. 6 illustrates a more detailed structure of the ripple injection circuit 220 of FIGS. 4 and 5, according to an example embodiment of inventive concepts.

As illustrated in FIG. 6, the ripple injection circuit 220A includes: a logic circuit 221; a first current source circuit 222; and a switching circuit 223.

The logic circuit 221 generates a pulse signal PS that is synchronized with a switching cycle according to which a voltage-down current path or a voltage-up current path is selectively formed. For example, the logic circuit 221 may generate a pulse signal PS when a comparison signal $V_{COMP}$ received from the DC-DC converter 210 transitions from a first logic level to a second logic level. The pulse signal PS may be generated as a one-shot pulse in the form of a positive pulse or a negative pulse.

The first current source circuit 222 is a circuit through which a DC current is supplied, and an output node of the first current source circuit 222 is connected to the switching circuit 223.

The switching circuit 223 is connected between the output node of the first current source circuit 222 and the feedback node Node_FB, and performs a switching operation based on the pulse signal PS applied to a control terminal. For example, when a pulse signal PS of a first level is applied to the control terminal, the switching circuit 223 is turned on.

As a result, a current generated by the first current source circuit 222 is applied to the feedback node Node_FB. Also, in a section of the pulse signal PS when the first level is not applied to the control terminal, the switching circuit 223 is turned off and no current is supplied from the first current source circuit 222 to the feedback node Node_FB.

Accordingly, a pulse current, which is synchronized with a switching cycle that selectively forms a voltage-down current path or a voltage-up current path of the DC-DC converter 210 based on a comparison signal $V_{COMP}$ received from the DC-DC converter 210, is applied to the feedback node Node_FB via the ripple injection circuit 220A.

Figure 7:
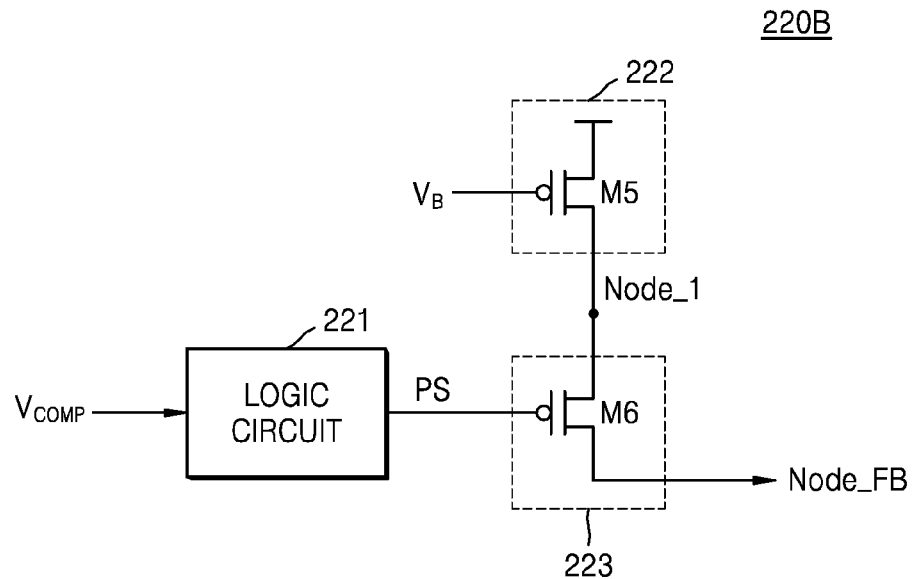
FIG. 7 illustrates a detailed structure of a first current source circuit and a switching circuit illustrated in FIG. 6 according to an example embodiment of inventive concepts.

FIG. 7 illustrates a more detailed structure of the first current source circuit 222 and the switching circuit 223 illustrated in FIG. 6, according to an example embodiment of inventive concepts.

Referring to FIG. 7, the first current source circuit 222 and the switching circuit 223 include transistors M5 and M6.

A first terminal of the transistor M5 is connected to a supply voltage, and a second terminal of the transistor M5 is connected to the first node Node_1. A bias voltage $V_B$ is applied to a gate terminal of the transistor M5. Also, a first terminal of the transistor M6 is connected to the first node Node_1, and a second terminal of the transistor M6 is connected to the feedback node Node_FB. A pulse signal PS generated in the logic circuit 221 is applied to a gate terminal of the transistor M6. For example, a one-shot pulse signal in the form of a negative pulse form may be applied as the pulse signal PS.

Figure 8:
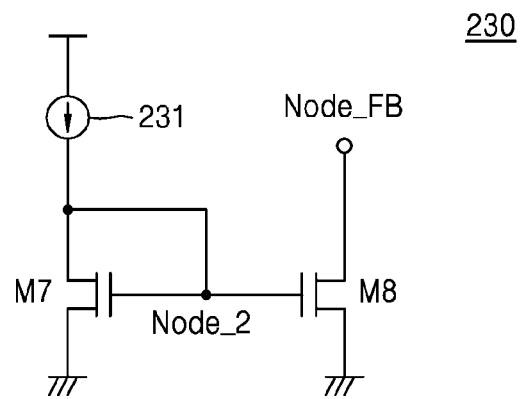
FIG. 8 illustrates a detailed structure of an offset compensation circuit illustrated in FIG. 5 according to an example embodiment of inventive concepts.

FIG. 8 illustrates a detailed structure of the offset compensation circuit 230 illustrated in FIG. 5, according to an example embodiment of inventive concepts.

As illustrated in FIG. 8, the offset compensation circuit 230 is formed of the second current source circuit 231 and transistors M7 and M8.

A first terminal and a gate terminal of the transistor M7 and an output node of the second current source circuit 231 are connected to a second node Node_2 and a second terminal of the transistor M7 is connected to a ground node. Also, a first terminal of the transistor M8 is connected to a feedback node Node_FB, a second terminal of the transistor M8 is connected to the ground node, and a gate terminal of the transistor M8 is connected to the second node Node_2. According to this example circuit configuration, a drain-source current of the transistor M7 is equal or substantially equal to a drain-source current of the transistor M8.

An amount of the drain-source current of the transistor M8 varies according to an amount of direct current generated in the second current source circuit 231, and thus, the amount of direct current generated in the second current source circuit 231 may be determined such that the drain-source current flows through the transistor M8 in order to offset an offset voltage generated by the ripple injection circuit 220.

Figure 9:
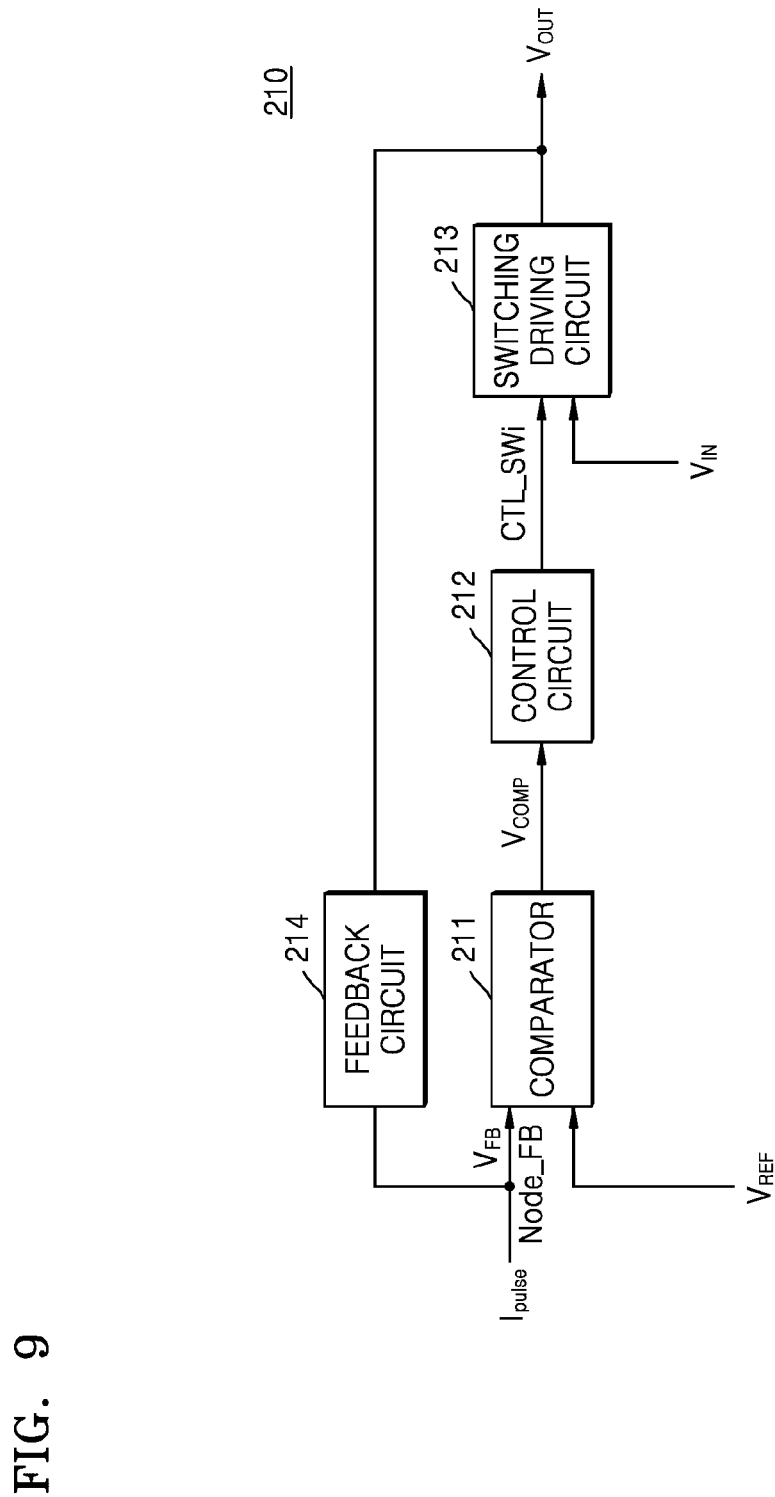
FIG. 9 illustrates a detailed structure of a direct current (DC)-DC converter illustrated in FIGS. 4 and 5 according to an example embodiment of inventive concepts.

FIG. 9 illustrates a detailed structure of the DC-DC converter 210 illustrated in FIGS. 4 and 5, according to an example embodiment of inventive concepts.

As illustrated in FIG. 9, the DC-DC converter 210 includes: a comparator 211; a control circuit 212; a switching driving circuit 213; and a feedback circuit 214.

The comparator 211 generates a comparison signal $V_{COMP}$ based on a difference between a feedback voltage $V_{FB}$ sensed at a feedback node Node_FB and a reference voltage $V_{REF}$. For example, when a feedback voltage $V_{FB}$ is higher than a reference voltage $V_{REF}$, a signal having a first phase may be generated. Otherwise, a signal having a second phase, which is the inverse of the first phase, may be generated. A signal having the first phase may be a signal indicating a first logic state, and a signal having the second phase may be a signal indicating a second logic state.

The control circuit 212 generates a switching control signal CTL_SWi corresponding to at least one phase by using a comparison signal $V_{COMP}$ generated in the comparator 211.

For example, the control circuit 212 may generate a COT type switching control signal CTL_SWi having a fixed pulse width and a variable pulse generation interval.

Alternatively, a switching control signal CTL_SWi having a variable pulse width, which varies based on a ratio between an input voltage $V_{INT}$ and an output voltage $V_{OUT}$ or a ratio between a current according to an input voltage $V_{IN}$ and a current according to an output voltage $V_{OUT}$, may be generated. In more detail, a switching control signal CTL_SWi having a pulse width that is proportional to $V_{IN}/V_{OUT}$ may be generated.

The switching driving circuit 213 performs a switching operation whereby, by using a switching control signal CTL_SWi corresponding to at least one phase, generated in the control circuit 212, a current path through which an output voltage $V_{OUT}$ is increased, is formed or a current path through which an output voltage $V_{OUT}$ is decreased, is formed.

For example, by using a switching control signal CTL_SWi with respect to at least one phase, the switching driving circuit 213 may perform an operation whereby a current due to an input voltage $V_{IN}$ flows toward an inductor connected to the output terminal or a current from the inductor connected to the output terminal flows toward a ground node.

The feedback circuit 214 has a circuit structure in which a feedback current generated based on a voltage $V_{OUT}$ of an output terminal is applied to a feedback node Node_FB.

Accordingly, a ripple of a feedback voltage $V_{FB}$ sensed at a feedback node Node_FB occurs as a result of a ripple voltage due to a current that is fed back from the output terminal and a ripple voltage due to a pulse current applied through the ripple injection circuit 220.

Figure 10:
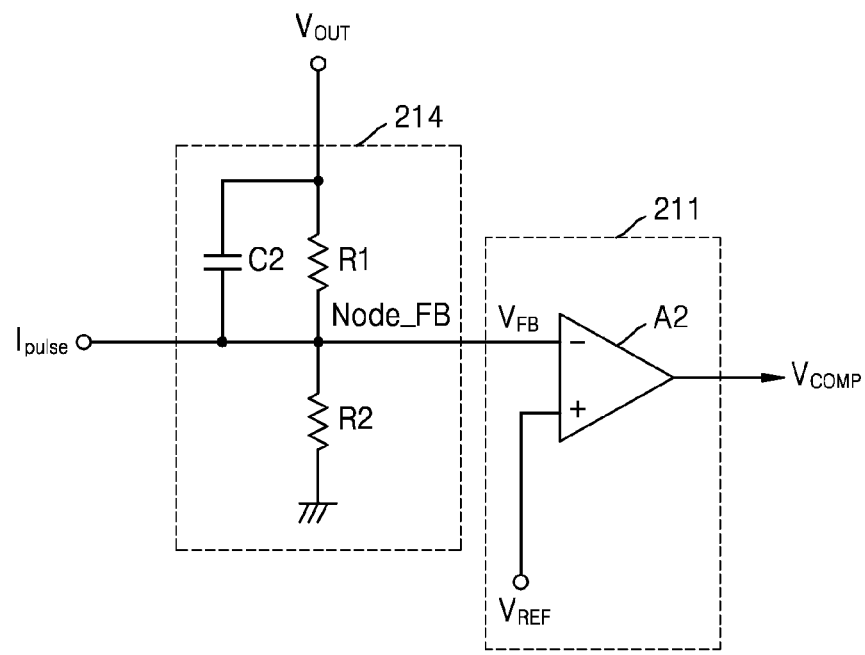
FIG. 10 illustrates a detailed structure of a feedback circuit and a comparator illustrated in FIG. 9 according to an example embodiment of inventive concepts.

FIG. 10 illustrates a detailed structure of the feedback circuit 214 and the comparator 211 illustrated in FIG. 9, according to an example embodiment of inventive concepts.

As illustrated in FIG. 10, the feedback circuit 214 is formed of resistors R1, R2 and a capacitor C2. The resistor R1 is connected between the output terminal and the feedback node Node_FB, and the resistor R2 is connected between the feedback node Node_FB and the ground node. The capacitor C2 is connected in parallel with the resistor R1 between the output terminal and the feedback node Node_FB.

The output voltage $V_{OUT}$ is divided by a voltage divider circuit formed of the resistors R1 and R2, and is output at the feedback node Node_FB. A ripple due to a switching operation of the DC-DC converter 210 is generated at the output voltage $V_{OUT}$.

Also, when a pulse current is applied to the feedback node Node_FB in the ripple injection circuit 220, a ripple voltage is generated at the feedback node Node_FB via the capacitor C2.

The comparator 211 may be formed of an operational amplifier (OP amp) A2. For example, a reference voltage $V_{REF}$ is applied to a positive input terminal (+) of the OP amp A2, and a feedback voltage $V_{FB}$ sensed at the feedback node Node_FB is applied to a negative input terminal (−) of the OP amp A2. When the feedback voltage $V_{FB}$ is greater than the reference voltage $V_{REF}$, a comparison signal $V_{COMP}$ output from the OP amp A2 is a voltage level LOW indicating a logic state '0', whereas when the feedback voltage $V_{FB}$ is smaller than the reference voltage $V_{REF}$, the comparison signal $V_{COMP}$ is a voltage level HIGH indicating a logic state '1.'

Alternatively, a reference voltage $V_{REF}$ may be applied to a negative input terminal (−) of the OP amp A2, and a feedback voltage $V_{FB}$ sensed at a feedback node Node_FB may be applied to a positive input terminal (+).

Figure 11:
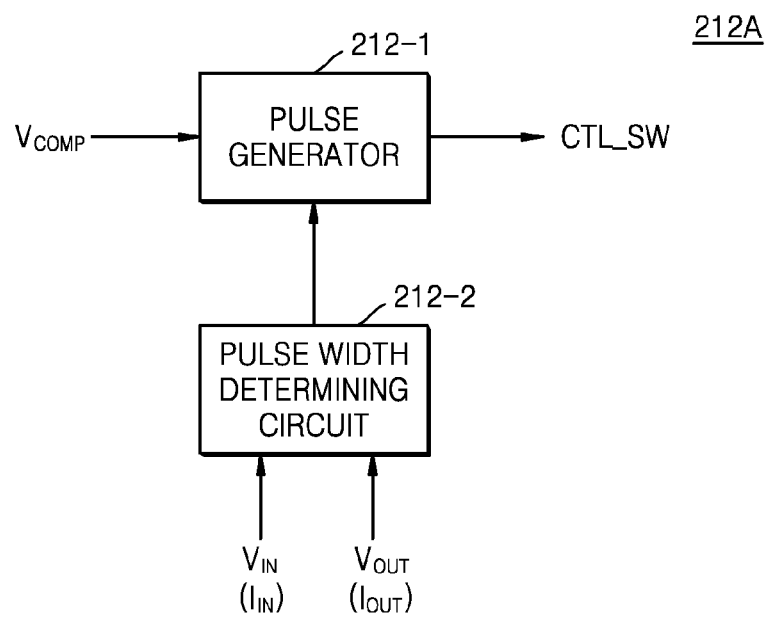
FIG. 11 illustrates a detailed structure of a control circuit illustrated in FIG. 9 according to an example embodiment of inventive concepts.

FIG. 11 illustrates a detailed structure of a control circuit 212A, which is an example of the control circuit 212 illustrated in FIG. 9, according to an example embodiment of inventive concepts. For reference, the control circuit 212A illustrates an example of a control circuit applied to a single phase type DC-DC converter.

As illustrated in FIG. 11, the control circuit 212A includes a pulse generator 212-1 and a pulse width determining circuit 212-2.

The pulse width determining circuit (or unit) 212-2 performs an operation of determining a pulse width of a switching control signal. For example, the pulse width determining circuit 202-2 determines a pulse width based on a ratio between an input voltage $V_{IN}$ and an output voltage $V_{OUT}$ or a ratio between a current $I_{in}$ according to an input voltage $V_{IN}$ and a current $I_{OUT}$ according to an output voltage $V_{OUT}$. In more detail, a pulse width may be determined such that the pulse width is variable in proportion to $V_{IN}/V_{OUT}$. Alternatively, a pulse width may be determined such that the pulse width varies in proportion to $I_{IN}/I_{OUT}$.

Alternatively, the pulse width determining circuit 212-2 may determine a pulse width that is fixed regardless or independent of a variation in an input voltage $V_{IN}$ or an output voltage $V_{OUT}$.

The pulse generator 212-1 generates a one-shot pulse having a pulse width determined by the pulse width determining circuit 212-2 when the comparison signal $V_{COMP}$ transitions from a first logic state to a second logic state. A one-shot pulse generated in the pulse generator 212-2 is a switching control signal CTL_SW.

Figure 12:
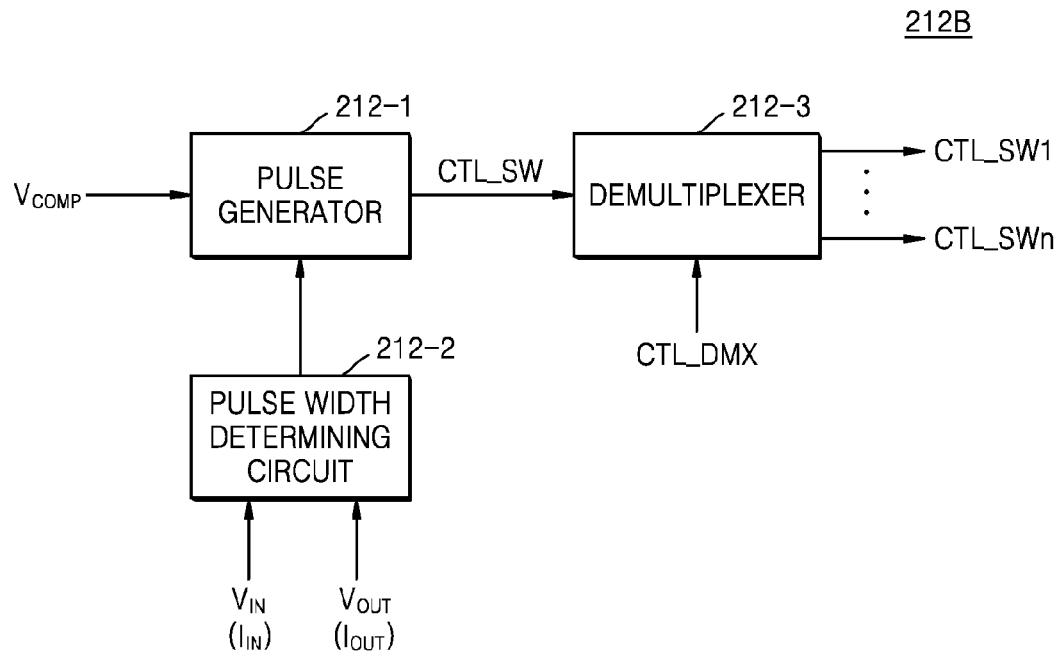
FIG. 12 illustrates a detailed structure of a control circuit illustrated in FIG. 9 according to another example embodiment of inventive concepts.

FIG. 12 illustrates a detailed structure of a control circuit 212B, which is an example of the control circuit 212 illustrated in FIG. 9, according to another example embodiment of inventive concepts. For reference, the control circuit 212B illustrated in FIG. 12 illustrates an example of a control circuit applied to a multi-phase type DC-DC converter.

As illustrated in FIG. 12, the control circuit 212B includes: a pulse generator 212-1; a pulse width determining circuit 212-2; and a demultiplexer 212-3.

The pulse generator 212-1 and the pulse width determining circuit 212-2 are described above with reference to FIG. 11, and thus, repeated description thereof will be omitted.

A switching control signal CTL_SW generated in the pulse generator 212-1 is output to the demultiplexer 212-3. According to a control signal CTL_DMX, the demultiplexer 212-3 transmits the switching control signal CTL_SW to an output node with respect to a matching phase. The control signal CTL_DMX may be generated based on a comparison signal $V_{COMP}$. Accordingly, an output node from which the switching control signal CTL_SW is output is sequentially shifted based on the comparison signal $V_{COMP}$.

Figure 13:
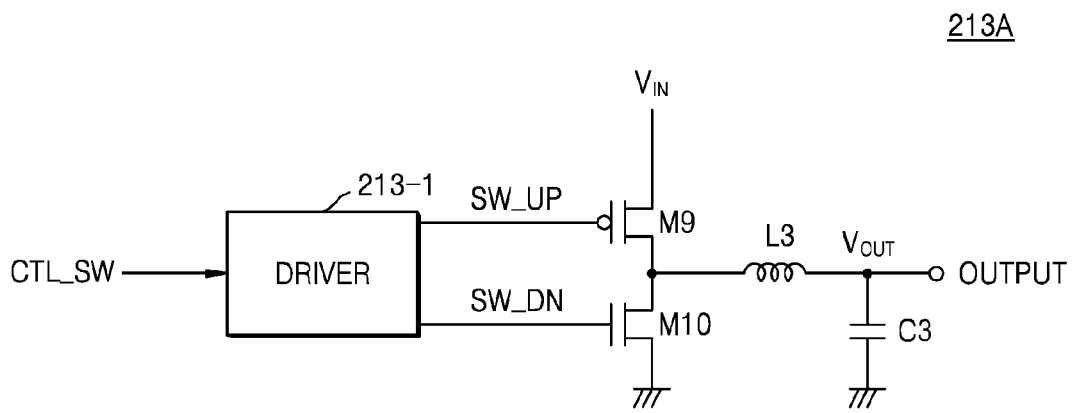
FIG. 13 illustrates a detailed structure of a switching driving circuit illustrated in FIG. 9 according to an example embodiment of inventive concepts.

FIG. 13 illustrates a detailed structure of a switching driving circuit 213A, which is an example of the switching driving circuit 213 illustrated in FIG. 9, according to an example embodiment of inventive concepts. For reference, the switching driving circuit 213A illustrated in FIG. 13 illustrates an example of a switching driving circuit applied to a single phase type DC-DC converter.

As illustrated in FIG. 13, the switching driving circuit 213A includes: a driver 213-1; a plurality of transistors M9 and M10; an inductor L3; and a capacitor C3.

A driver 213-1 generates a voltage-up switching signal SW_UP and a voltage-down switching signal SW_DN based on an input switching control signal CTL_SW, and outputs the voltage-up switching signal SW_UP and the voltage-down switching signal SW_DN to a first driving terminal and a second driving terminal, respectively. For example, a voltage-up switching signal SW_UP may be generated according to a switching control signal CTL_SW, such that a length of a section (or interval) in which the transistor M9 for increasing a voltage is turned on corresponds to a pulse width of the switching control signal CTL_SW. Alternatively, a voltage-down switching signal SW_DN may be generated according to a switching control signal CTRL_SW, such that a length of a section (or interval) in which the transistor M10 for decreasing a voltage is turned corresponds to a pulse width of a switching control signal CTL_SW.

Accordingly, when a feedback voltage $V_{FB}$ is smaller than a reference voltage $V_{REF}$, the transistor M9 is turned on according to a voltage-up switching signal SW_UP during a one-shot pulse ON time section of the switching control signal CTL_SW. Also, the transistor M10 is turned off. Accordingly, during the one-shot pulse ON time section of the switching control signal CTL_SW, a current due to an input voltage $V_{IN}$ flows to an output terminal OUTPUT through an inductor L3, thereby increasing the output voltage $V_{OUT}$. After the one-shot pulse ON time section of the switching control signal CTL_SW has passed, the transistor M10 is turned on according to a voltage-down switching signal. Also, the transistor M9 is turned off. Accordingly, the output voltage $V_{OUT}$ charged in the capacitor C3 is discharged to a ground node through the inductor L3 and the transistor M10, which is turned on, and thus, the output voltage $V_{OUT}$ is decreased. The transistor M10 stays turned on until a one-shot pulse of a next switching control signal CTL_SW is generated.

Figure 14:
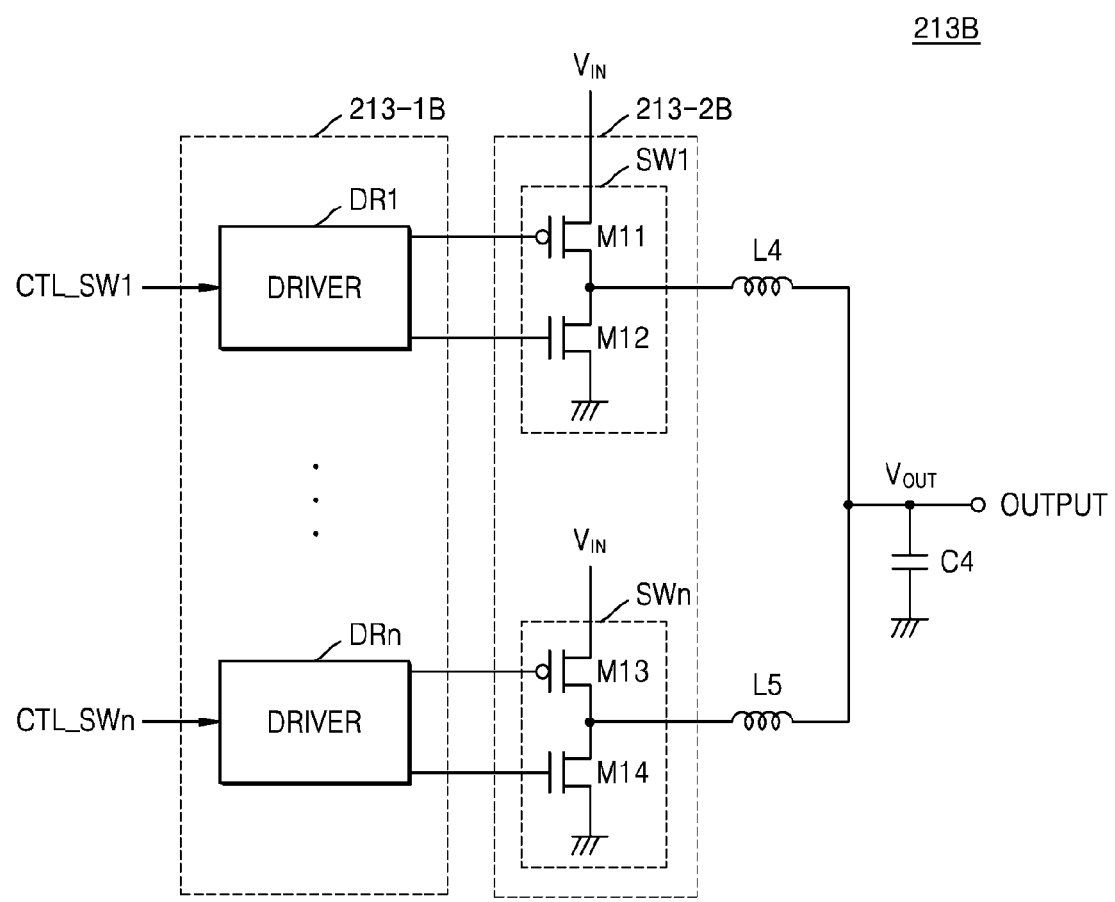
FIG. 14 illustrates a detailed structure of a switching driving circuit illustrated in FIG. 9 according to another example embodiment of inventive concepts.

FIG. 14 illustrates a detailed structure of a switching driving circuit 213B, which is an example of the switching driving circuit 213 illustrated in FIG. 9, according to another example embodiment of inventive concepts. For reference, the switching driving circuit 213B illustrated in FIG. 14 illustrates an example of a switching driving circuit applied to a multi-phase type DC-DC converter.

As illustrated in FIG. 14, the switching driving circuit 213B includes: a driver circuit 213-1B; a switching circuit 213-2B; a plurality of inductors L4 and L5; and a capacitor C4.

The driver circuit 213-1B is formed of a plurality of drivers DR1 through DRn. Each driver DRi generates a voltage-up switching signal and a voltage-down signal using a switching control signal CTL_SWi that matches a corresponding phase, and outputs the voltage-up switching signal and the voltage-down switching signal. For example, each driver DRi may generate a voltage-up switching signal whereby a length of a section, in which a voltage-up switching circuit with respect to a corresponding phase is turned on, is determined according to a pulse width of the switching control signal CTL_SWi. Alternatively, each driver DRi may generate a voltage-down switching signal whereby a length of an interval, in which a voltage-down switching circuit with respect to a corresponding phase is turned on, is determined according to a pulse width of the switching control signal CTL_SWi.

The switching circuit 213-2B is formed of a plurality of switching circuits SW1 through SWn. Each switching circuit SWi switches a current path with respect to each corresponding phase so as to increase or decrease an output voltage $V_{OUT}$ based on a voltage-up switching signal and a voltage-down switching signal that are input through the driver DRi matching each corresponding phase.

For example, a switching circuit SWn operates as follows based on a voltage-up switching signal and a voltage-down switching signal that are input via a driver DRn.

When a feedback voltage $V_{FB}$ is smaller than a reference voltage $V_{REF}$, a transistor M13 is turned on according to a voltage-up switching signal generated in the driver DRn during a one-shot pulse ON time section of the switching control signal CTL_SWn. Also, a transistor M14 is turned off. Accordingly, during the one-shot pulse on time section of the switching control signal CTL_SWn, a current due to an input voltage $V_{IN}$ flows to an output terminal OUTPUT via an inductor L5 so as to increase the output voltage $V_{OUT}$. After the one-shot pulse on time section of the switching control signal CTL_SWn has passed, the transistor M14 is turned on according to the voltage-down switching signal. Also, the transistor M13 is turned off. Accordingly, the output voltage $V_{OUT}$ charged in the capacitor C4 is discharged to a ground node through the inductor L5 and the transistor M14, which is turned on, thereby decreasing the output voltage $V_{OUT}$. The transistor M14 stays turned on until a one-shot pulse of a switching control signal CTL_SWi with respect to a next phase is generated.

As described above, the plurality of drivers DR1 through DRn respectively correspond to the plurality of switching circuits SW1 through SWn according to a phase shift, and operate such that a driver and a switching circuit that match each other operate in sequential order.

Figure 15:
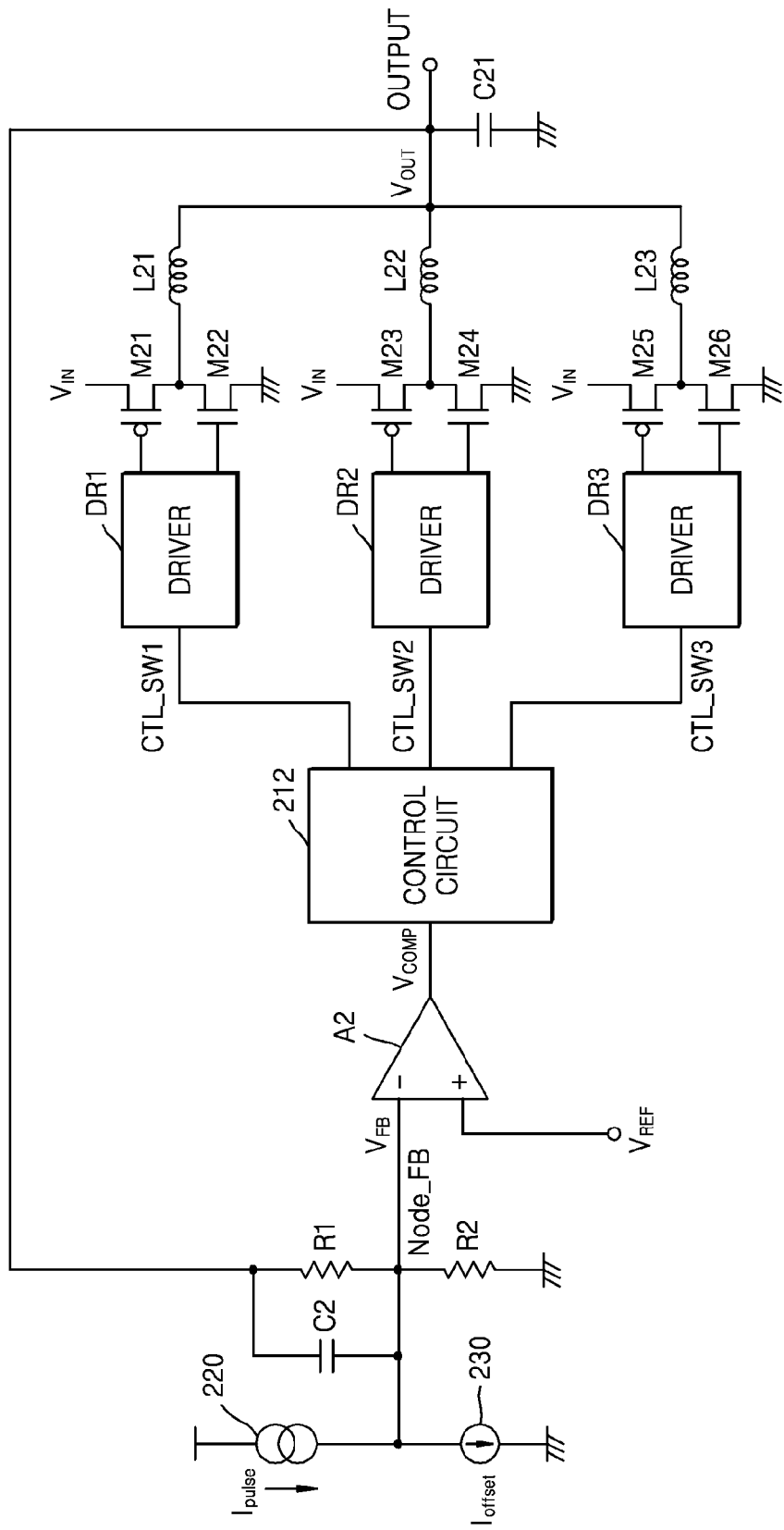
FIG. 15 is a circuit diagram illustrating a ripple injection three-phase type switching regulator according to an example embodiment of inventive concepts.

FIG. 15 is a circuit diagram illustrating a ripple injection three-phase type switching regulator according to an example embodiment of inventive concepts.

For example, the ripple injection three-phase type switching regulator may be configured (or alternatively designed) such that the rest of circuit elements except inductors L21, L22, and L23 and a capacitor C21 are integrated in a single semiconductor chip in the ripple injection three-phase type switching regulator.

As described above, the ripple injection switching regulator according to at least some example embodiments of inventive concepts is not limited to the ripple injection three-phase type switching regulator, but may also include a ripple injection single-phase type switching regulator or a multi-phase type switching regulator of two or more phases.

Figure 16:
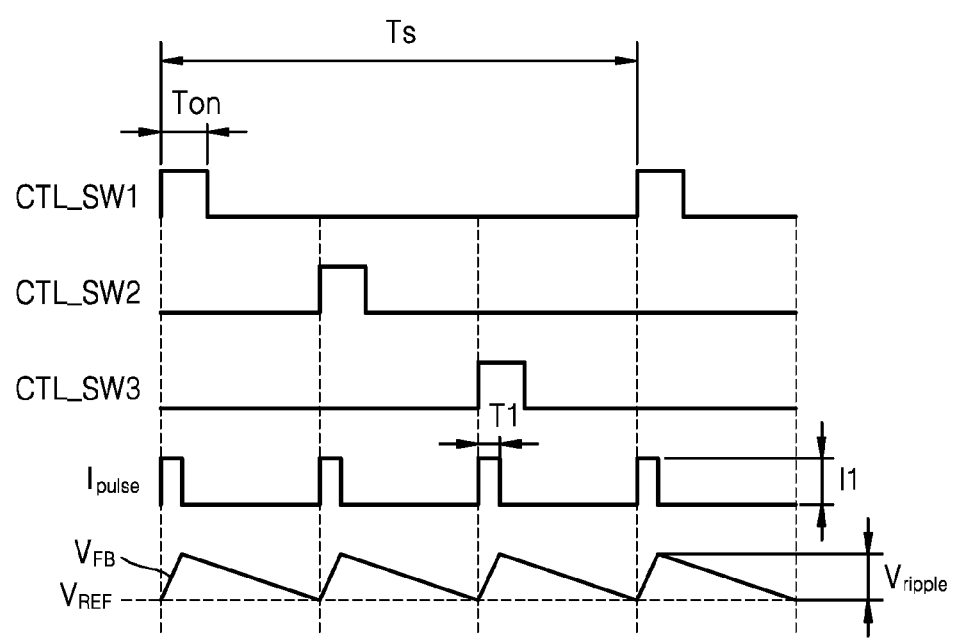
FIG. 16 is a timing diagram of major signals of the ripple injection three-phase type switching regulator of FIG. 15 according to an example embodiment of inventive concepts.

FIG. 16 is a timing diagram of major signals of the ripple injection three-phase type switching regulator of FIG. 15, according to an example embodiment of inventive concepts.

Referring to FIGS. 15 and 16, when a pulse current Ipulse is applied to a feedback node Node_FB via the ripple injection circuit 220, a ripple is generated in a feedback voltage $V_{FB}$ sensed at the feedback node Node_FB via the capacitor C2.

A phase of a comparison signal $V_{COMP}$ output from the OP amp A1, which functions as the comparator 211 is reversed according to the ripple voltage generated in the feedback voltage $V_{FB}$ sensed at the feedback node Node_FB. According to the reversion of the phase of the comparison signal $V_{COMP}$, the control circuit 212 sequentially generates switching control signals CTL_SW1, CTL_SW2, and CTL_SW3 having waveforms as illustrated in FIG. 16.

First, when a one-shot pulse of the switching control signal CTL_SW1 is generated, a transistor M21 is turned on and a transistor M22 is turned off during a section Ton of the switching control signal CTL_SW1 according to a voltage-up switching signal and a voltage-down switching signal generated in a driver DR1. Accordingly, a current flows from an input terminal, to which an input voltage $V_{IN}$ is applied, to the output terminal OUTPUT via the inductor L21. Consequently, the output voltage $V_{OUT}$ is increased. After the section Ton of the switching control signal CTL_SW1 has passed, the transistor M22 is turned on and the transistor M21 is turned off. Accordingly, a current due to the output voltage $V_{OUT}$ charged in the capacitor C21 of the output terminal flows to a ground node via the inductor L21 and the transistor M22 which is turned on. Accordingly, the output voltage $V_{OUT}$ is decreased. The transistors M21 and M22 are turned off when a one-shot pulse of a next switching control signal, the switching control signal CTL_SW2, is generated, and an operation of increasing or decreasing the output voltage $V_{OUT}$ due to the current flowing through the inductor L21 is stopped.

Next, when a one-shot pulse of the switching control signal CTL_SW2 is generated, a transistor M23 is turned on and a transistor M24 is turned off during a section Ton of the switching control signal CTL_SW2 according to a voltage-up switching signal and a voltage-down switching signal generated in a second driver DR2 based on the switching control signal CTL_SW2. Accordingly, a current flows from an input terminal, to which an input voltage $V_{IN}$ is applied, to the output terminal OUTPUT via the inductor L22. Consequently, the output voltage $V_{OUT}$ is increased. After the section Ton of the switching control signal CTL_SW2 has passed, the transistor M24 is turned on and the transistor M23 is turned off. Accordingly, a current due to the output voltage $V_{OUT}$ charged in the capacitor C21 of the output terminal flows to a ground node via the inductor L22 and the transistor M24, which is turned on. Accordingly, the output voltage $V_{OUT}$ is decreased. When a one-shot pulse of a next switching control signal, the switching control signal CTL_SW3, is generated, the transistors M23 and M24 are turned off, and an operation of increasing or decreasing the output voltage $V_{OUT}$ due to the current flowing to the inductor L22 is stopped.

Next, when a one-shot pulse of the switching control signal CTL_SW3 is generated, a transistor M25 is turned on and a transistor M26 is turned off during a section Ton of the switching control signal CTL_SW3 according to a voltage-up switching signal and a voltage-down switching signal generated in a third driver DR3 based on the switching control signal CTL_SW3. Accordingly, a current flows from an input terminal, to which an input voltage $V_{IN}$ is applied, to the output terminal OUTPUT via the inductor L23. Consequently, the output voltage $V_{OUT}$ is increased. After the section Ton of the switching control signal CTL_SW3 has passed, the transistor M26 is turned on and the transistor M25 is turned off. Accordingly, a current due to the output voltage $V_{OUT}$ charged in the capacitor C21 of the output terminal flows to a ground node via the inductor L23 and the transistor M26, which is turned on. Accordingly, the output voltage $V_{OUT}$ is decreased. When a one-shot pulse of a next switching control signal, the switching control signal CTL_SW1, is generated, the transistors M25 and M26 are turned off, and an operation of increasing or decreasing the output voltage $V_{OUT}$ due to the current flowing to the inductor L23 is stopped.

An offset voltage is generated at the output terminal OUTPUT due to a pulse current Ipulse applied to the feedback node Node_FB via the ripple injection circuit 220. The offset compensation circuit 230 is a circuit for offsetting the offset voltage. In FIG. 15, the offset compensation circuit 230 refers to a current source through which a current Ioffset flows.

The current Ioffset through which an offset voltage is offset may be calculated as follows.

An error voltage Verror occurring at the output terminal OUTPUT due to the pulse current Ipulse applied to the feedback node Node_FB via the ripple injection circuit 220 is expressed as shown below in Equation 1.

$$Verror = Verror(pulse) + Verror(ripple) \quad \text{[Equation 1]}$$

Here, Verror(pulse) denotes an error voltage generated due to a pulse current Ipulse applied to the feedback node Node_FB, and Verror(ripple) denotes an error voltage generated due to a ripple voltage according to the pulse current Ipulse applied to the feedback node Node_FB.

First, the error voltage Verror(pulse) is expressed as shown below in Equation 2.

$$\begin{aligned} Verror(pulse) &= Ipulse(average) * (R1 // R2) * (R1 + R2) // R2 \quad \text{[Equation 2]} \\ &= Ipulse(average) * R1 \\ &= I1 * (T1/Ts) * Ph * R1 \end{aligned}$$

Here, I1 denotes amplitude of the pulse current Ipulse, T1 denotes a pulse width of the pulse current Ipulse, Ts denotes a one-shot pulse generation period of a switching control signal CTL_SWi in each phase, and Ph denotes the number of phases. In the case of the switching regulator as illustrated in FIG. 15, the number of phases Ph is 3.

Next, the error voltage Verror(ripple) is expressed as shown below in Equation 3.

$$\begin{aligned} error(ripple) &= 0.5 * Vripple(\text{peak to peak}) * 2 \quad \text{[Equation 3]} \\ &= (T1 * I1 / C2) \end{aligned}$$

When Equations 2 and 3 are substituted into Equation 1, Verror is given by Equation 4 shown below.

$$Verror = I1 * \{T1/C2 - T1/(Ts/Ph) * R1\} \quad \text{[Equation 4]}$$

Accordingly, the offset current Ioffset may be determined as shown below in Equation 5.

$$Ioffset = -Verror/R1 \; I1 * \{T1/(Ts/Ph) - T1/C2/R1\} \quad \text{[Equation 5]}$$

By allowing the offset current Ioffset determined according to Equation 5 to flow from the feedback node Node_FB to the ground node via the offset compensation circuit 230, an offset voltage generated due to the pulse current Ipulse may be offset.

As described above, by injecting a pulse current Ipulse into the feedback node Node_FB of the DC-DC converter, even when a ripple current occurring at the output voltage $V_{OUT}$ of the DC-DC converter is relatively small, a switching regulation operation may be performed more stably. Accordingly, a ceramic capacitor having a relatively small equivalent series resistance (ESR) may be applied as the capacitor C21 connected to the output terminal OUTPUT.

Next, a method of controlling an operation of a ripple injection type switching regulator according to an example embodiment of inventive concepts will be described.

Figure 17:
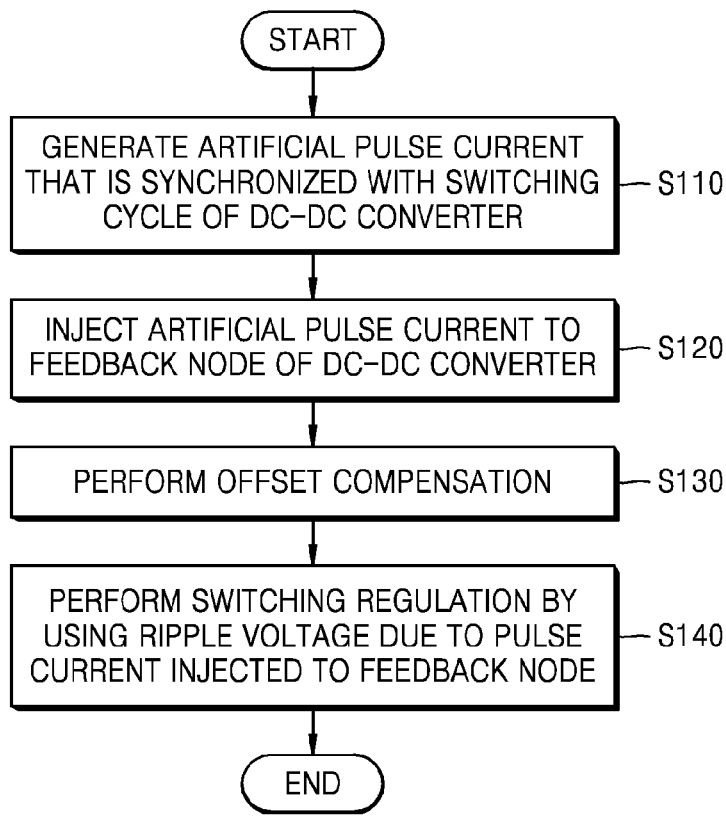
FIG. 17 is a flowchart of a method of controlling an operation of a ripple injection type switching regulator according to an example embodiment of inventive concepts.

FIG. 17 is a flowchart of a method of controlling an operation of a ripple injection type switching regulator according to an example embodiment of inventive concepts.

Referring to FIG. 17, in operation S110, the switching regulator generates an artificial pulse current synchronized with a switching cycle of a DC-DC converter. For example, a pulse current that is synchronized with a switching cycle that selectively forms a voltage-down current path or a voltage-up current path is generated based on a result of comparing a voltage sensed at a feedback node of the DC-DC converter and a reference voltage.

In operation S120, the switching regulator injects the artificially generated pulse current to the feedback node of the DC-DC converter. Accordingly, a voltage due to a feedback current that flows from the output terminal to the feedback node and the pulse current is sensed at the feedback node.

In operation S130, the switching regulator allows an offset compensation current, through which an offset voltage according to the pulse current that is artificially applied to the feedback node is offset, to flow from the feedback node of the DC-DC converter to the ground node.

In operation S140, the switching regulator performs a switching regulation operation by using a ripple voltage due to the pulse current that is artificially injected to the feedback node.

Figure 18:
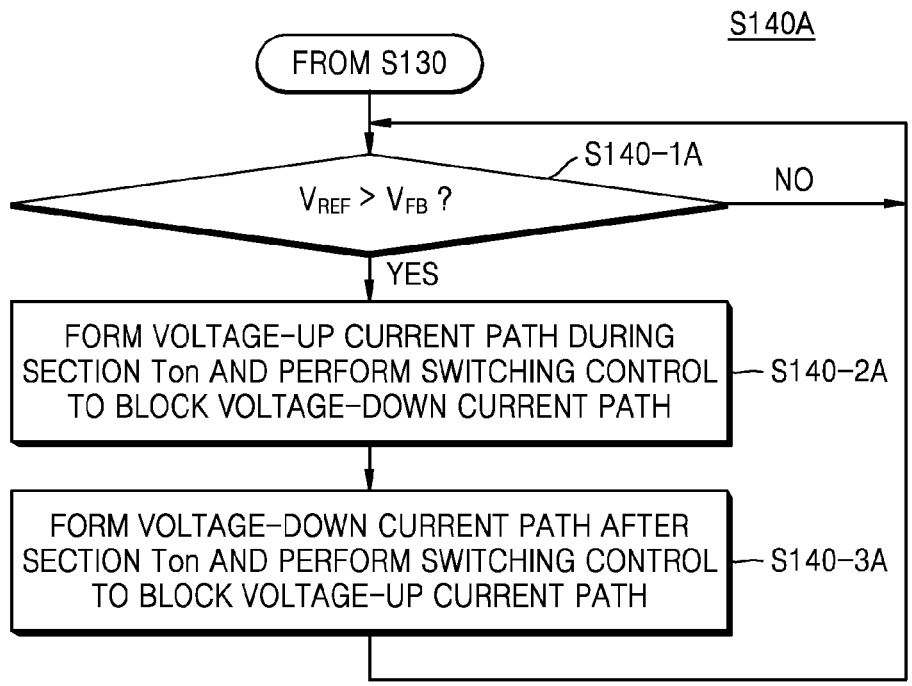
FIG. 18 is a flowchart of an operation of performing switching regulation illustrated in FIG. 17, according to an example embodiment of inventive concepts.

FIG. 18 is a flowchart of an example embodiment of operation 5140A of performing switching regulation illustrated in FIG. 17 in a single phase-type DC-DC converter.

Referring to FIG. 18, in operation S140-1A, a single-phase type DC-DC converter compares a feedback voltage $V_{FB}$ sensed at the feedback node and a reference voltage $V_{REF}$. For example, whether the feedback voltage $V_{FB}$ is smaller than the reference voltage $V_{REF}$ is determined.

When the feedback voltage $V_{FB}$ is smaller than the reference voltage $V_{REF}$, the single-phase type DC-DC converter forms a voltage-up current path and blocks a voltage-down current path in operation S140-2A. For example, in the switching driving circuit 213A of the single-phase type DC-DC converter as illustrated in FIG. 13, the transistor M9 is turned on and the transistor M10 is turned off during a one-shot pulse on time section Ton of a switching control signal CTL_SW. When the transistor M9 is turned on, a voltage-up current path is formed to increase an output voltage $V_{OUT}$.

After the one-shot pulse on time section Ton of the switching control signal CTL_SWi has passed, the single-phase type DC-DC converter forms a voltage-down current path and blocks the voltage-up current path in operation S140-3A. For example, the transistor M10 is turned on and the transistor M9 is turned off in the switching driving circuit 213A of the single-phase type DC-DC converter. When the transistor M10 is turned on, a voltage-down current path is formed to decrease the output voltage $V_{OUT}$. For example, the voltage-down current path is maintained until a one-shot pulse of a next switching control signal CTL_SW is generated. Alternatively, the voltage-down current path may be maintained until the feedback voltage $V_{FB}$ is smaller than the reference voltage $V_{REF}$.

By repeating operations S140-1A through S140-3A, a more stable output voltage $V_{OUT}$ may be obtained.

Figure 19:
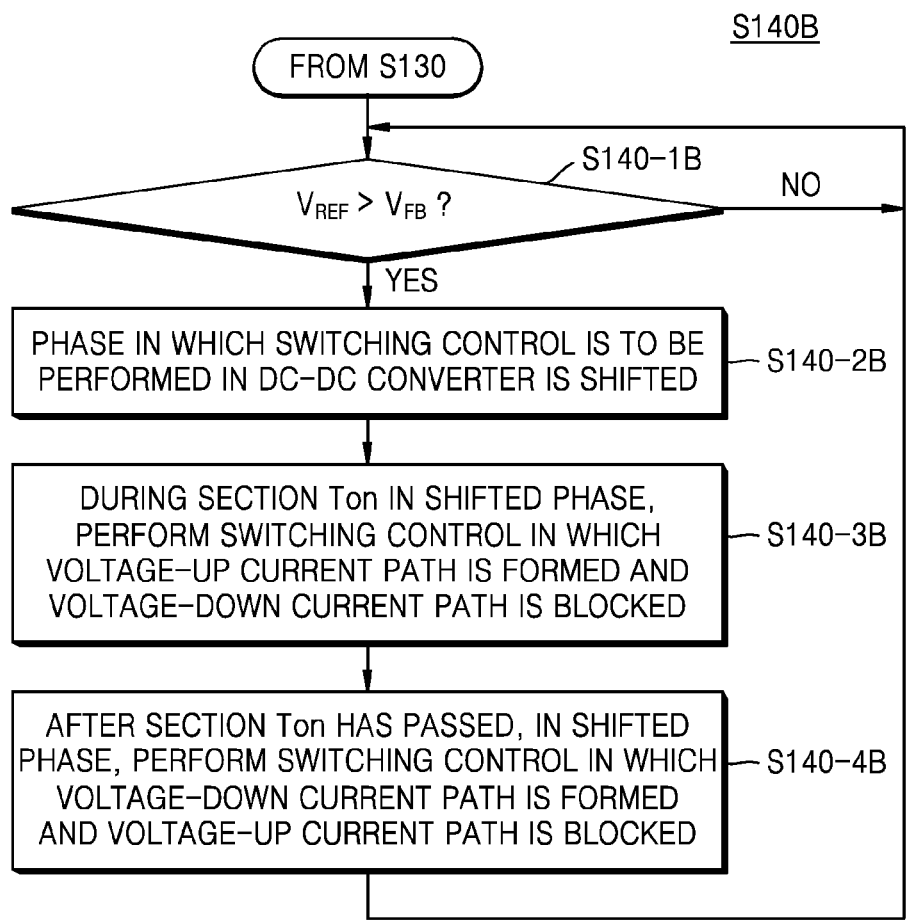
FIG. 19 is a flowchart of an operation of performing switching regulation illustrated in FIG. 17, according to another example embodiment of inventive concepts.

FIG. 19 is a flowchart of an example embodiment of operation 5140B of performing switching regulation illustrated in FIG. 17 in a multi-phase type DC-DC converter.

Referring to FIG. 19, in operation S140-1B, the multi-phase type DC-DC converter compares a feedback voltage $V_{FB}$ sensed at a feedback node and a reference voltage $V_{REF}$. For example, whether the feedback voltage $V_{FB}$ is smaller than the reference voltage $V_{REF}$ is determined.

When the feedback voltage $V_{FB}$ is smaller than the reference voltage $V_{REF}$, a phase in which the output voltage $V_{OUT}$ in the multi-phase type DC-DC converter is to be switched, is shifted in operation S140-2B.

When the feedback voltage $V_{FB}$ is smaller than the reference voltage $V_{REF}$, the multi-phase type DC-DC converter forms a voltage-up current path and blocks a voltage-down current path in operation S140-3B. For example, in the switching driving circuit 213B of the multi-phase type DC-DC converter as illustrated in FIG. 14, during a one-shot pulse on time section Ton of a switching control signal CTL_SWn, the transistor M13 is turned on and the transistor M14 is turned off. When the transistor M13 is turned on, a voltage-up current path is formed to increase the output voltage $V_{OUT}$.

After the one-shot pulse on time section Ton of the switching control signal CTL_SWn has passed, the multi-phase type DC-DC converter forms a voltage-down current path for a shifted phase PH(n) and blocks the voltage-up current path in operation S140-4B. For example, in the switching driving circuit 213B of the multi-phase type DC-DC converter as illustrated in FIG. 14, the transistor M14 is turned on and the transistor M13 is turned off. When the transistor M14 is turned on, a voltage-down current path is formed to decrease the output voltage $V_{OUT}$. For example, the voltage-down current path is maintained until a one-shot pulse of a next switching control signal CTL_SWi is generated. Alternatively, the voltage-down current path may be maintained until the feedback voltage $V_{FB}$ becomes smaller than the reference voltage $V_{REF}$.

By repeating operations S140-1B through S140-4B, a more stable output voltage $V_{OUT}$ may be obtained.

Figure 20:
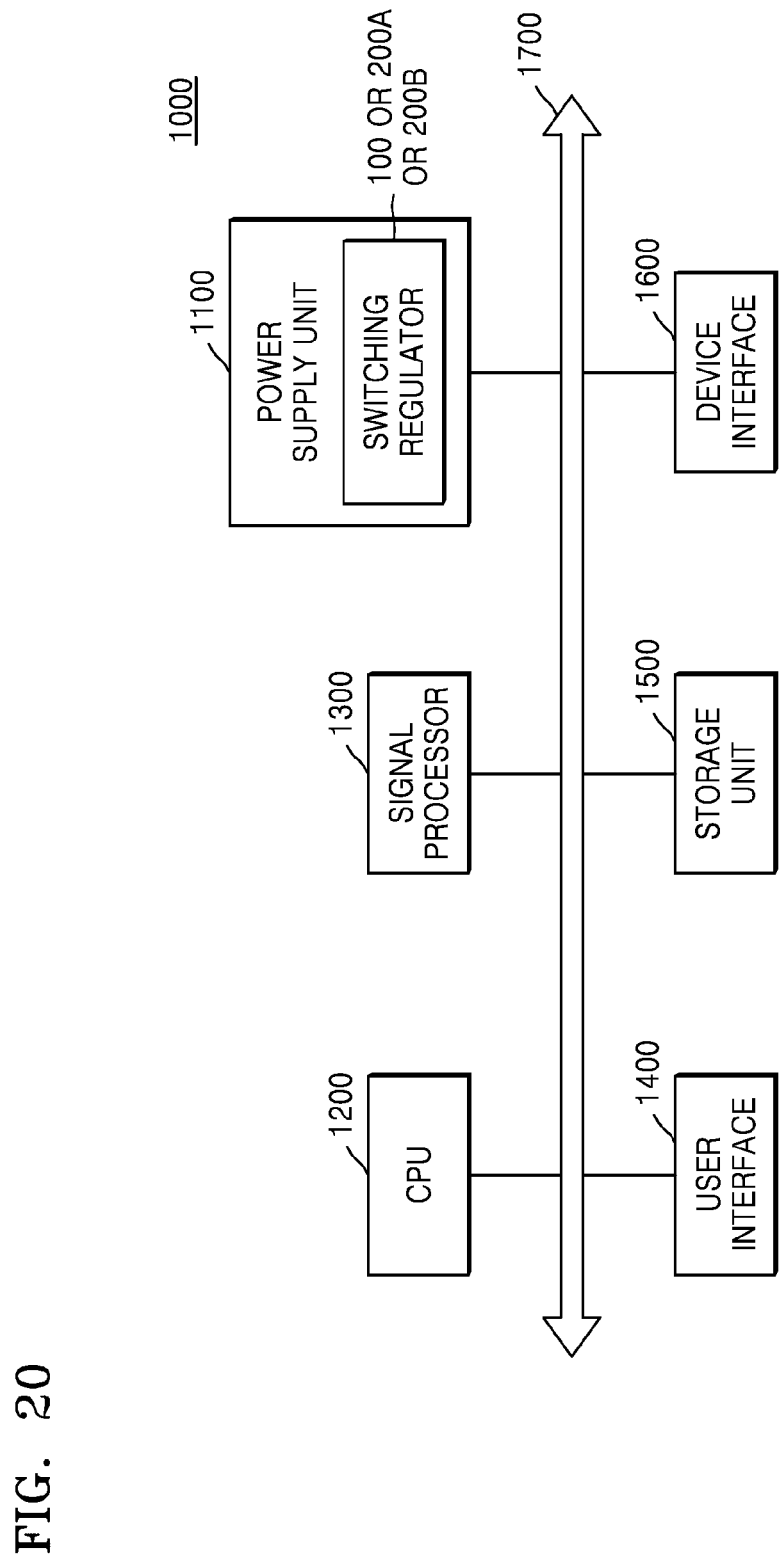
FIG. 20 illustrates an electronic device including a switching regulator according to example embodiments of inventive concepts.

FIG. 20 illustrates an electronic device 1000 including one or more switching regulators (e.g., 100, 200A or 200B) according to example embodiments of inventive concepts.

As illustrated in FIG. 20, the electronic device 1000 includes: a power supply unit (or circuit) 1100; a central processing unit (CPU) 1200; a signal processor 1300; a user interface 1400; a storage unit (or device) 1500; a device interface 1600; and a bus 1700.

Examples of the electronic device 1000 may include: a computer; a mobile phone; a personal digital assistant (PDA); a portable multimedia player (PMP); an MP3 player; a camera; a camcorder; a television (TV) receiver; and a display device.

The power supply unit 1100 generates a supply voltage needed in the electronic device 1000, and supplies the supply voltage to each element of the electronic device 1000. At least one of the switching regulators 100, 200A, and 200B according to example embodiments of inventive concepts may be used as the power supply unit 1100.

The CPU 1200 performs an operation of controlling the electronic device 1000 overall. For example, the CPU 1200 may control elements of the electronic device 1000 based on information input via the user interface 1400.

The signal processor 1300 processes a signal received via the device interface 1600 or a signal read from the storage unit 1500 according to set rules. For example, the signal processor 1300 may perform video signal processing, audio signal processing, etc.

The user interface 1400 is an input device via which a function of the electronic device 100 is set or a user sets information needed to operate the electronic device 1000.

The storage unit 1500 stores various information needed to operate the electronic device 1000. Also, data received via the device interface 1600 or data processed in the electronic device 1000 may be stored in the storage unit 1500. The storage unit 1500 may include volatile and/or non-volatile memory devices.

The device interface 1600 performs data communication with respect to an external device that is connected to the electronic device 1000 in a wired or wireless manner.

The bus 1700 performs the function of transmitting information between elements of the electronic device 1000.

While inventive concepts have been particularly shown and described with reference to some example embodiments thereof, it will be understood that various changes in form and details may be made therein without departing from the spirit and scope of the following claims.

What is claimed is:

1. A switching regulator comprising:
a direct current (DC)-DC converter configured to generate a comparison signal based on a comparison between a reference voltage and a feedback voltage sensed at a feedback node, and to generate an output voltage at an output terminal based on the comparison signal, the feedback voltage sensed at the feedback node resulting from a pulse current and a feedback voltage output from the output terminal to the feedback node; and
a ripple injection circuit configured to generate the pulse current based on the comparison signal.

2. The switching regulator of claim 1, wherein the DC-DC converter is further configured to generate the output voltage at the output terminal by selecting one of a voltage-down current path and a voltage-up current path based on the comparison signal.

3. The switching regulator of claim 2, wherein the ripple injection circuit is further configured to generate the pulse current in synchronization with the selection of the voltage-down current path or the voltage-up current path.

4. The switching regulator of claim 1, further comprising:
an offset compensation circuit configured to reduce an offset voltage by forming a path through which an offset compensation current flows from the feedback node to a ground node.

5. The switching regulator of claim 1, wherein the ripple injection circuit comprises:
a logic circuit configured to generate a pulse signal in response to a transition of the comparison signal from a first logic state to a second logic state; and
a switching circuit configured to generate the pulse current based on the pulse signal.

* * * * *